US008689097B2

(12) United States Patent
Varadarajan et al.

(10) Patent No.: US 8,689,097 B2
(45) Date of Patent: Apr. 1, 2014

(54) SYSTEM AND METHOD FOR AUTOMATIC GENERATION OF PRESENTATIONS BASED ON AGENDA

(75) Inventors: Sridhar Varadarajan, Bangalore (IN); Ravi Gururaj Amur, Bangalore (IN); Korrapati Kalyana Rao, Bangalore (IN)

(73) Assignee: Satyam Computer Services Ltd., Secunderabad (IN)

( * ) Notice: Subject to any disclaimer, the term of this patent is extended or adjusted under 35 U.S.C. 154(b) by 1596 days.

(21) Appl. No.: 11/650,695

(22) Filed: Jan. 8, 2007

(65) Prior Publication Data

US 2008/0040340 A1 Feb. 14, 2008

Related U.S. Application Data

(63) Continuation-in-part of application No. 10/814,927, filed on Mar. 31, 2004, now abandoned.

(51) Int. Cl.
*G06F 17/00* (2006.01)
(52) U.S. Cl.
USPC ............ 715/230; 715/201; 715/730; 715/732
(58) Field of Classification Search
USPC ................. 715/200–202, 230, 255, 730–732; 705/7–9
See application file for complete search history.

(56) References Cited

U.S. PATENT DOCUMENTS

| | | | |
|---|---|---|---|
| 5,917,480 A * | 6/1999 | Tafoya et al. ................. | 715/732 |
| 6,148,330 A | 11/2000 | Puri et al. | |
| 6,473,096 B1 * | 10/2002 | Kobayashi et al. ........... | 715/731 |
| 6,516,340 B2 | 2/2003 | Boys | |
| 6,580,438 B1 | 6/2003 | Ichimura et al. | |
| 6,684,369 B1 | 1/2004 | Bernardo et al. | |
| 7,246,316 B2 * | 7/2007 | Furlong et al. ................ | 715/730 |
| 7,266,773 B2 * | 9/2007 | Dorwart ........................ | 715/731 |
| 7,383,509 B2 * | 6/2008 | Foote et al. ................... | 715/731 |
| 7,428,704 B2 * | 9/2008 | Baker et al. ................... | 715/730 |
| 7,607,089 B2 * | 10/2009 | Baker et al. ................... | 715/730 |
| 7,707,502 B2 * | 4/2010 | Coulomb et al. ............. | 715/730 |
| 2003/0126136 A1 * | 7/2003 | Omoigui ........................ | 707/10 |
| 2005/0091579 A1 * | 4/2005 | Mewherter et al. ........... | 715/513 |

(Continued)

OTHER PUBLICATIONS

Chial, M.R., Ph.D., "Tips for Building Computer-Based Presentations", University of Wisconsin—Madison, 2002, pp. 1-10.

(Continued)

*Primary Examiner* — Cesar Paula
*Assistant Examiner* — Howard Cortes
(74) *Attorney, Agent, or Firm* — The Webb Law Firm

(57) ABSTRACT

In enterprises, presentations are designed and made to visiting clients on a routine basis and it is expected that such presentations be effective as much of business depends on right kind of information in right depth and volume made to right audience. The typically followed manual process depends on the capabilities of a person to create such presentations. It is required to obtain as little information as possible to generate presentations as much automatically as possible. The automatic generation of presentations is based on (a) agenda; (b) audience profile; and (c) templates. The system analyzes an agenda and audience profile to obtain adequate information to identify the most appropriate templates and uses the same to generate one or more draft presentation versions that best match the requirements of the agenda. Further, the invention also provides for an automatic generation of (a) slide annotations; (b) presentation theme; and (c) templates.

4 Claims, 27 Drawing Sheets

ILLUSTRATIVE REPRESENTATION OF A DICTIONARY, TEMPLATE, AGENDA, AND AUDIENCE

(56) References Cited

U.S. PATENT DOCUMENTS

| | | | |
|---|---|---|---|
| 2005/0108619 A1* | 5/2005 | Theall et al. | 715/500 |
| 2005/0125246 A1* | 6/2005 | Muller et al. | 705/1 |
| 2007/0038610 A1* | 2/2007 | Omoigui | 707/3 |
| 2007/0055939 A1* | 3/2007 | Furlong et al. | 715/731 |
| 2007/0288278 A1* | 12/2007 | Alexander et al. | 705/8 |

OTHER PUBLICATIONS

Hamm, P.H., Ph.D., "Teaching and Persuasive Communication: Class Presentation Skills", published on the Web, 2003, pp. 1-15.

* cited by examiner

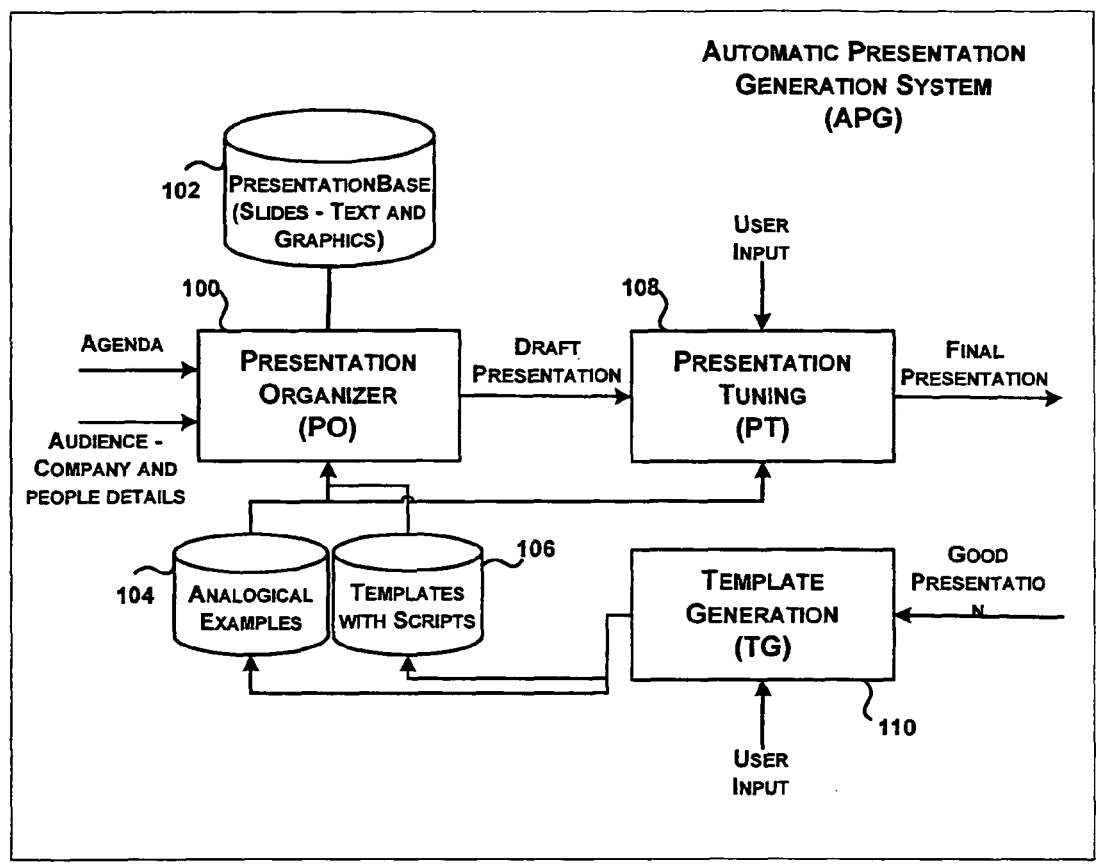
FIG. 1: SYSTEM ARCHITECTURE OF APG SYSTEM

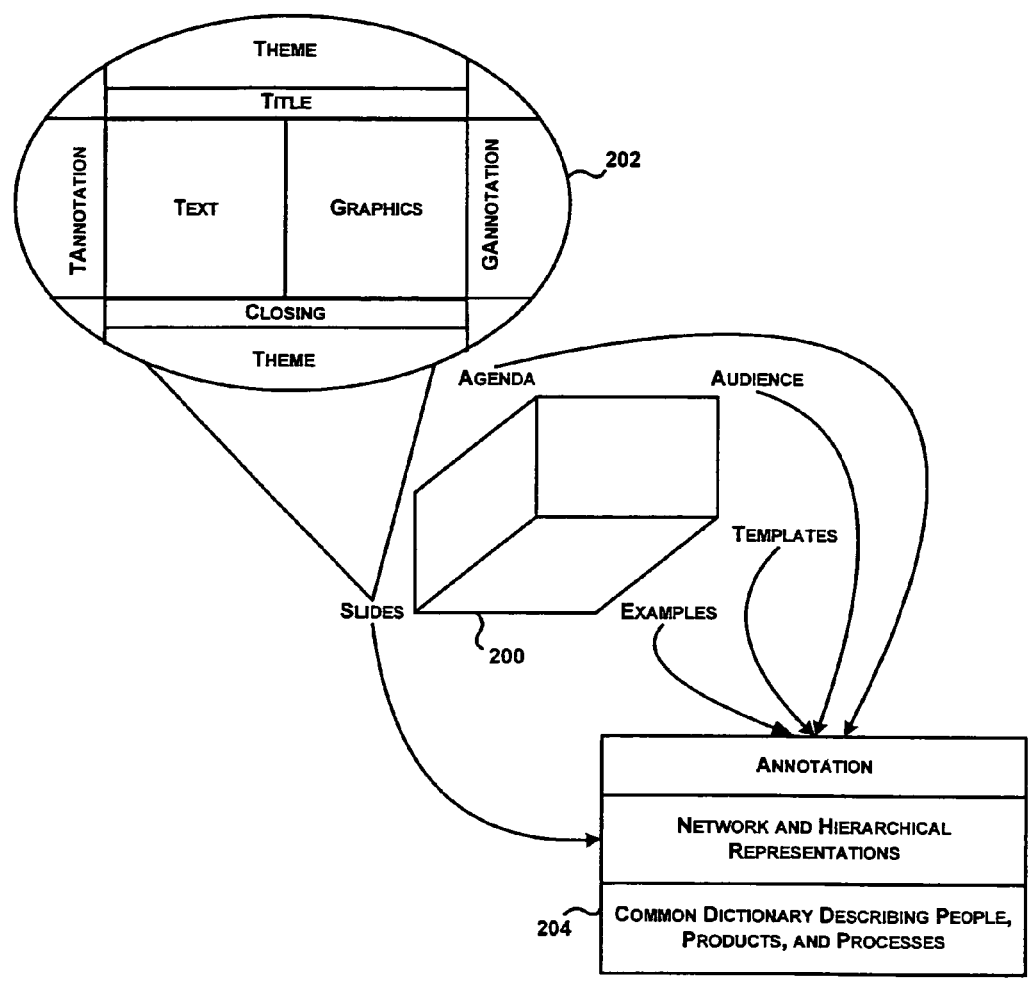
FIG. 2: KEY ELEMENTS OF APG AND THEIR DESCRIPTION

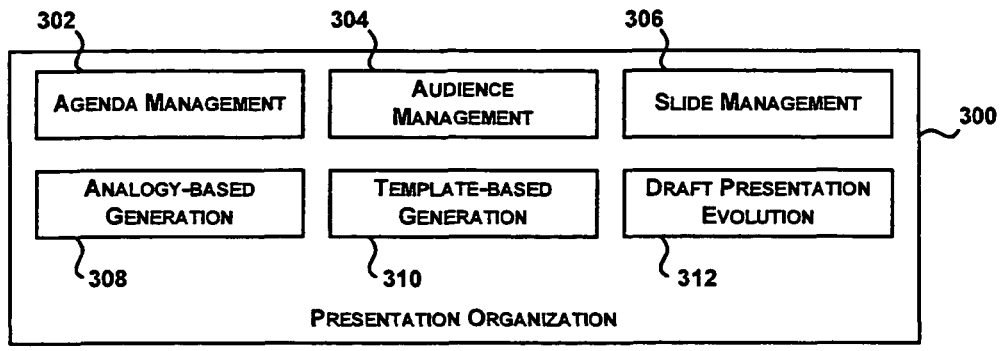
FIG. 3: PRESENTATION ORGANIZER MODULES
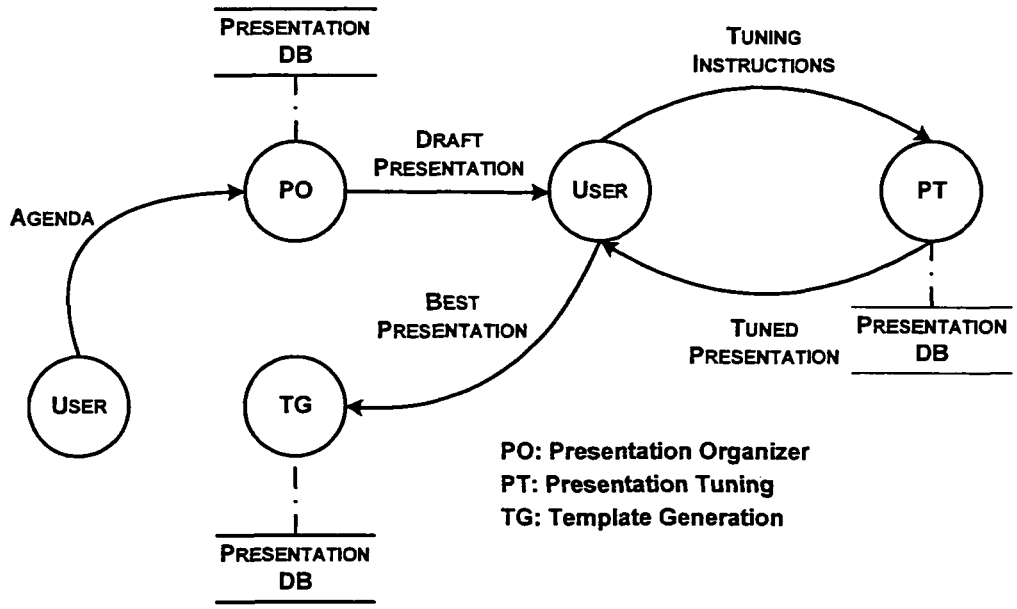
FIG. 3A: A TYPICAL WORKFLOW

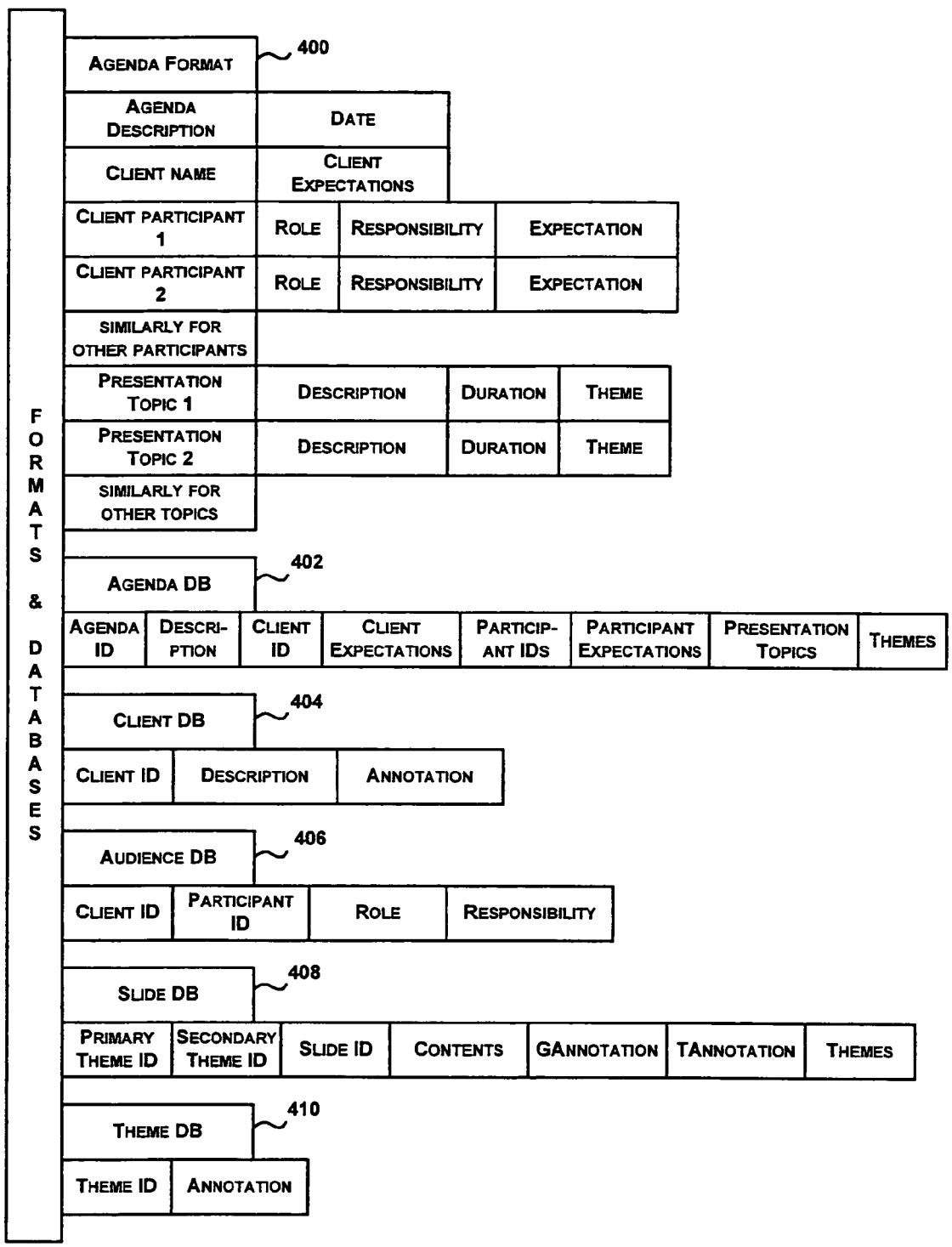
FIG. 4: DESCRIPTION OF DBs

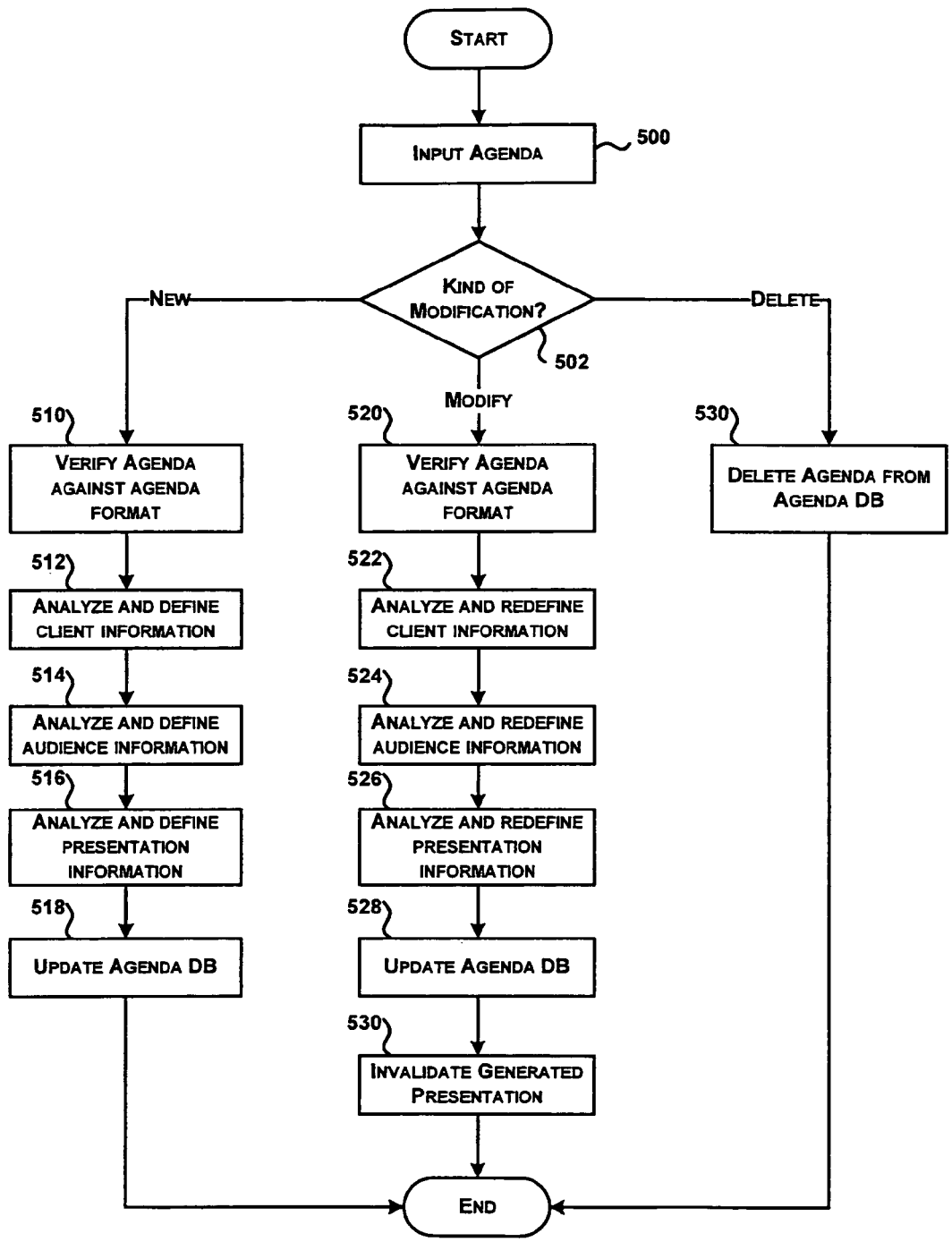
FIG. 5: AGENDA MANAGEMENT PROCEDURES

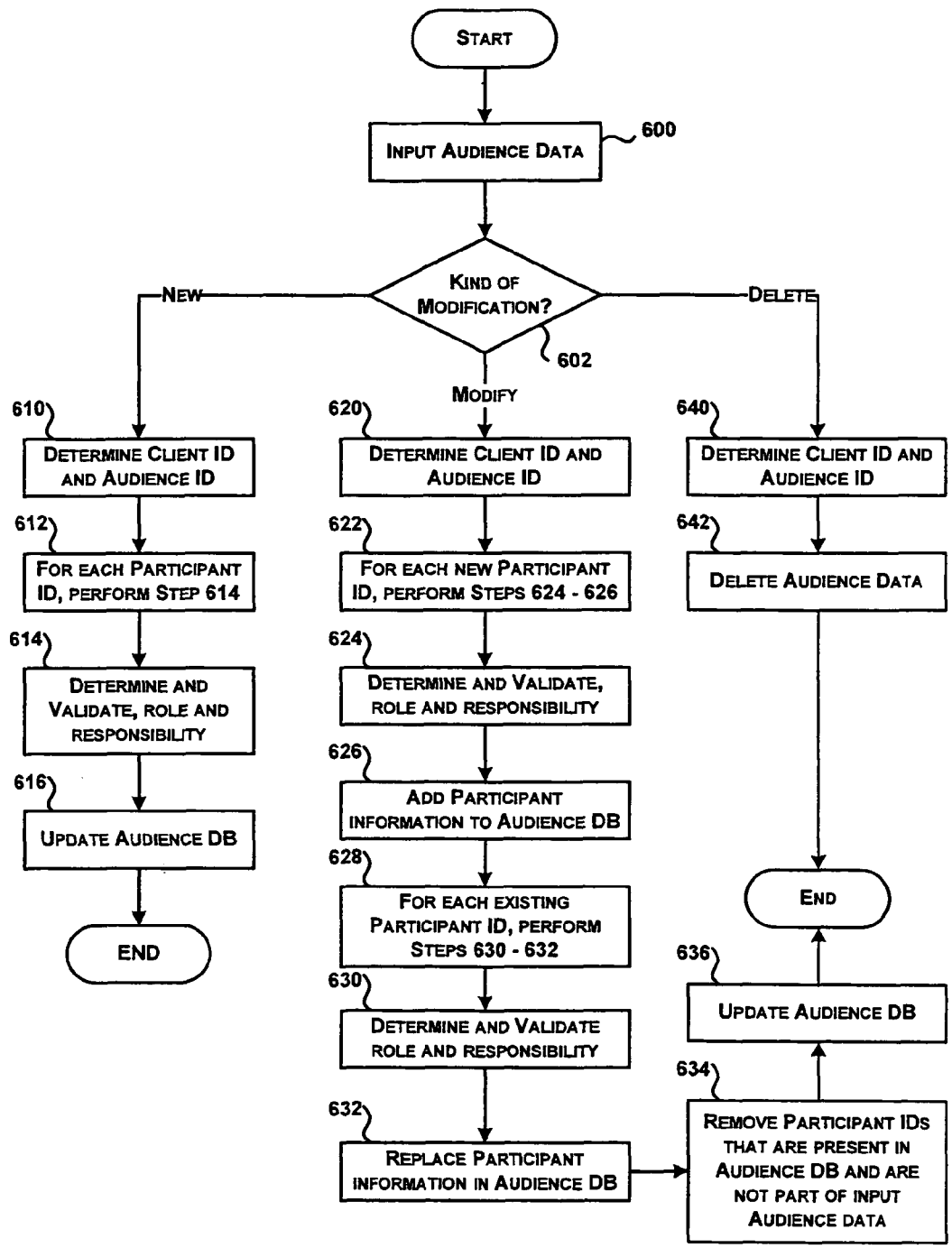
FIG. 6: AUDIENCE MANAGEMENT PROCEDURES

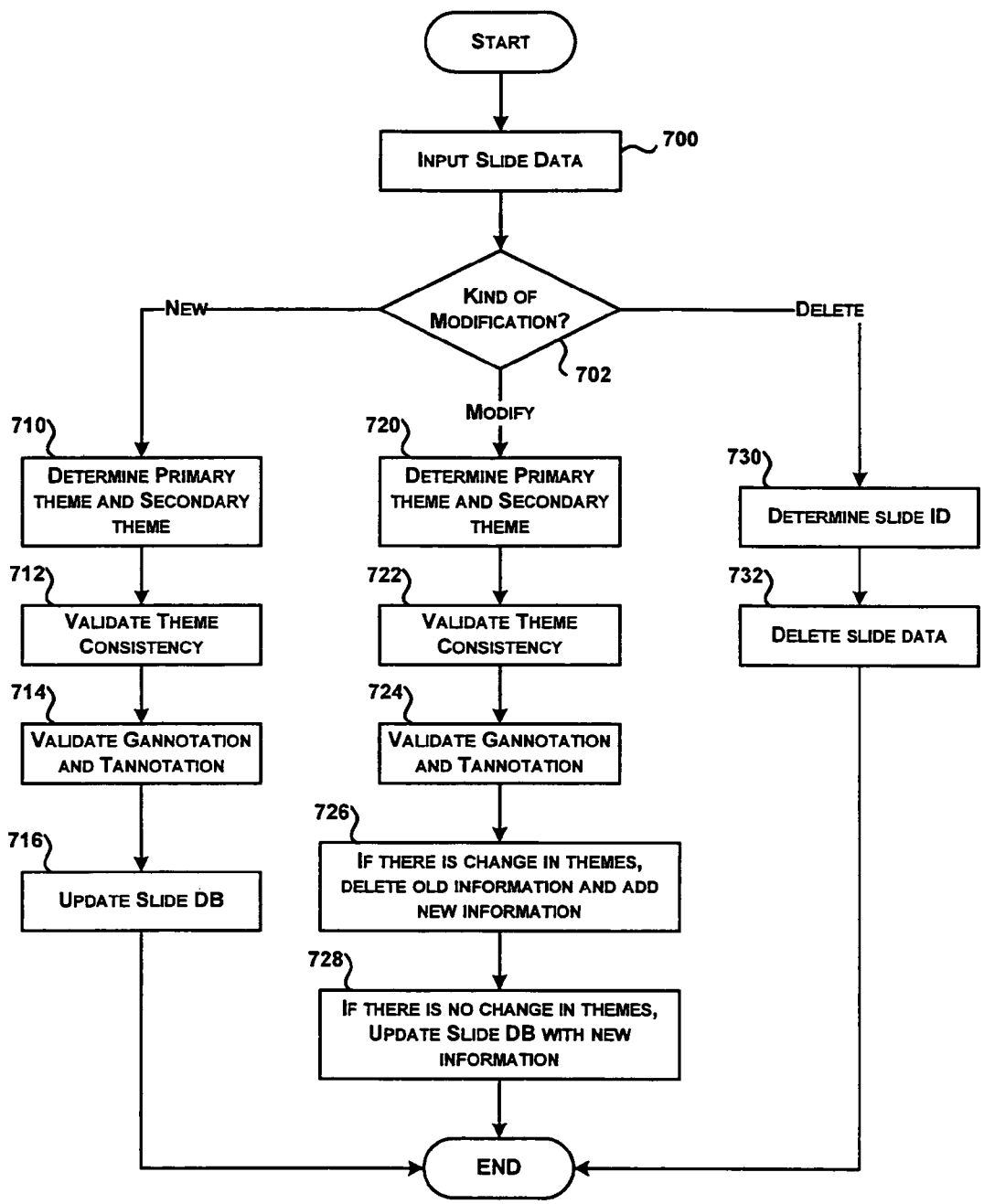
FIG. 7: SLIDE MANAGEMENT PROCEDURES

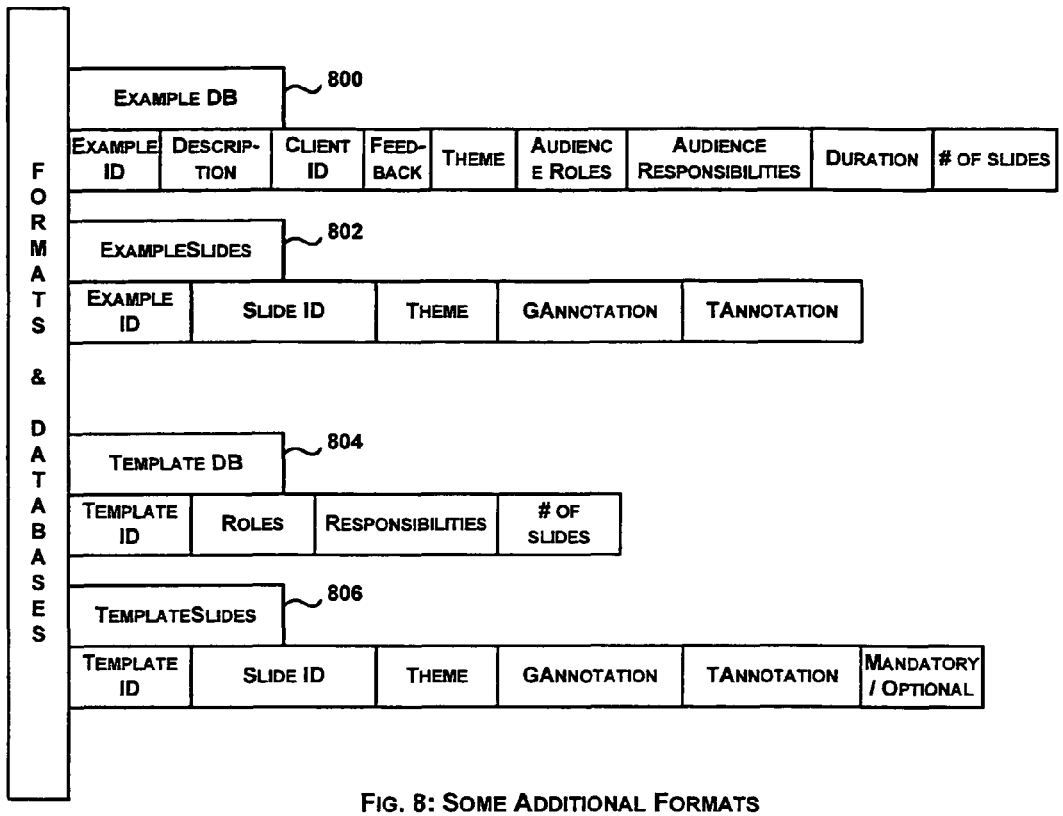

FIG. 8: SOME ADDITIONAL FORMATS

| CONDITIONS FOR TEMPLATE SELECTION BASED ON AUDIENCE (ROLES / RESPONSIBILITIES) AND THEMES | 850 |
| --- | --- |
| NUMBER OF SLIDES (RANGE) | 852 |
| SLIDE ORDER (BASED ON THEME) - SCRIPT BASED DESCRIPTION | 854 |
| SCRIPT BASED MANDATORY SLIDE DEFINITION - THEME, TANNOTATION, GANNOTATION | 856 |
| SCRIPT BASED OPTIONAL SLIDE DEFINITION - THEME, TANNOTATION, GANNOTATION | 858 |

FIG. 8A: TEMPLATE REPRESENTATION

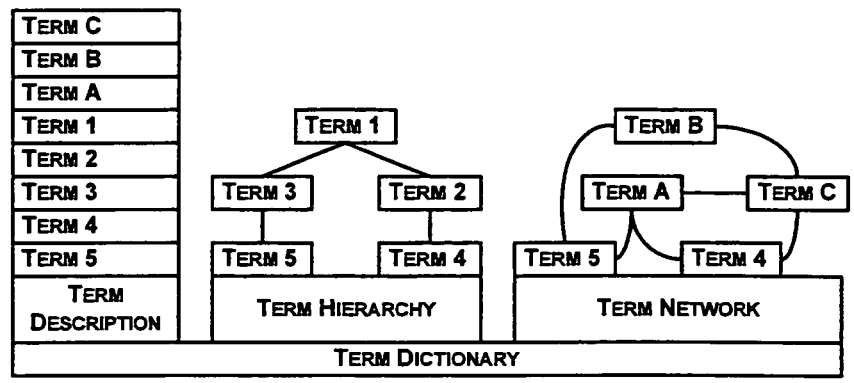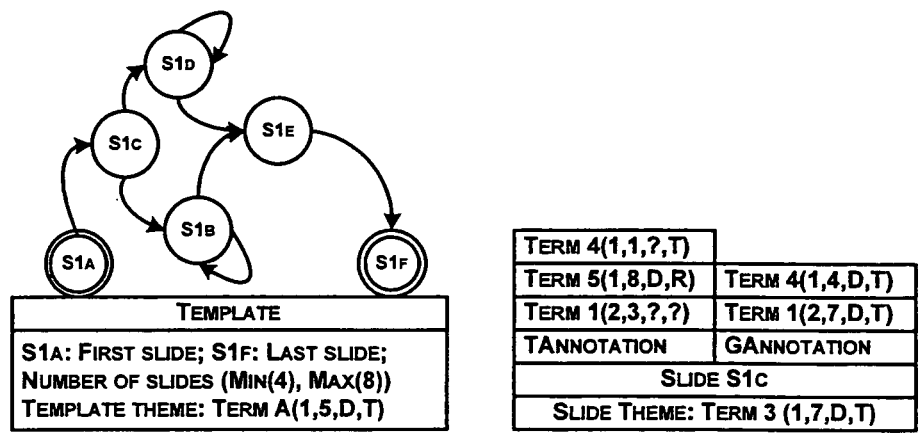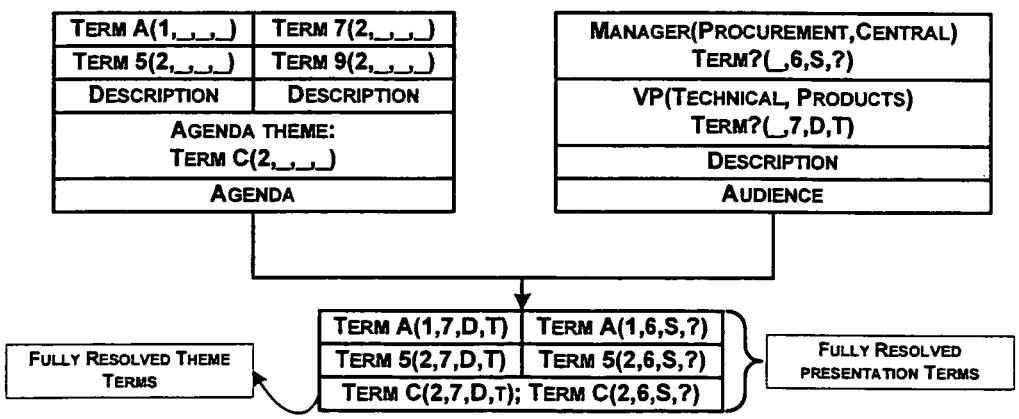
FIG. 8B: ILLUSTRATIVE REPRESENTATION OF A DICTIONARY, TEMPLATE, AGENDA, AND AUDIENCE

| Designation | Nature of Work | Area of Work | dF | pF | kF |
|---|---|---|---|---|---|
| Director | R&D | Products | 6 | D | R |
| Engineer | Production | Products | 4 | D | T |
| VP | Marketing | Sales | 5 | D | T |
| Manager | Procurement | Central | 7 | S | M |

| pLookup-Table | Product(D) | Process(S) | People(L) |
|---|---|---|---|
| Product(D) | 0 | 9 | 9 |
| Process(S) | 9 | 0 | 9 |
| People(L) | 9 | 9 | 0 |

| kLookup-Table | Technology (T) | Research(R) | Market(M) |
|---|---|---|---|
| Technology (T) | 0 | 3 | 9 |
| Research(R) | 3 | 0 | 3 |
| Market(M) | 9 | 3 | 0 |

Fig. 8C: Illustrative Representation of Lookup Tables

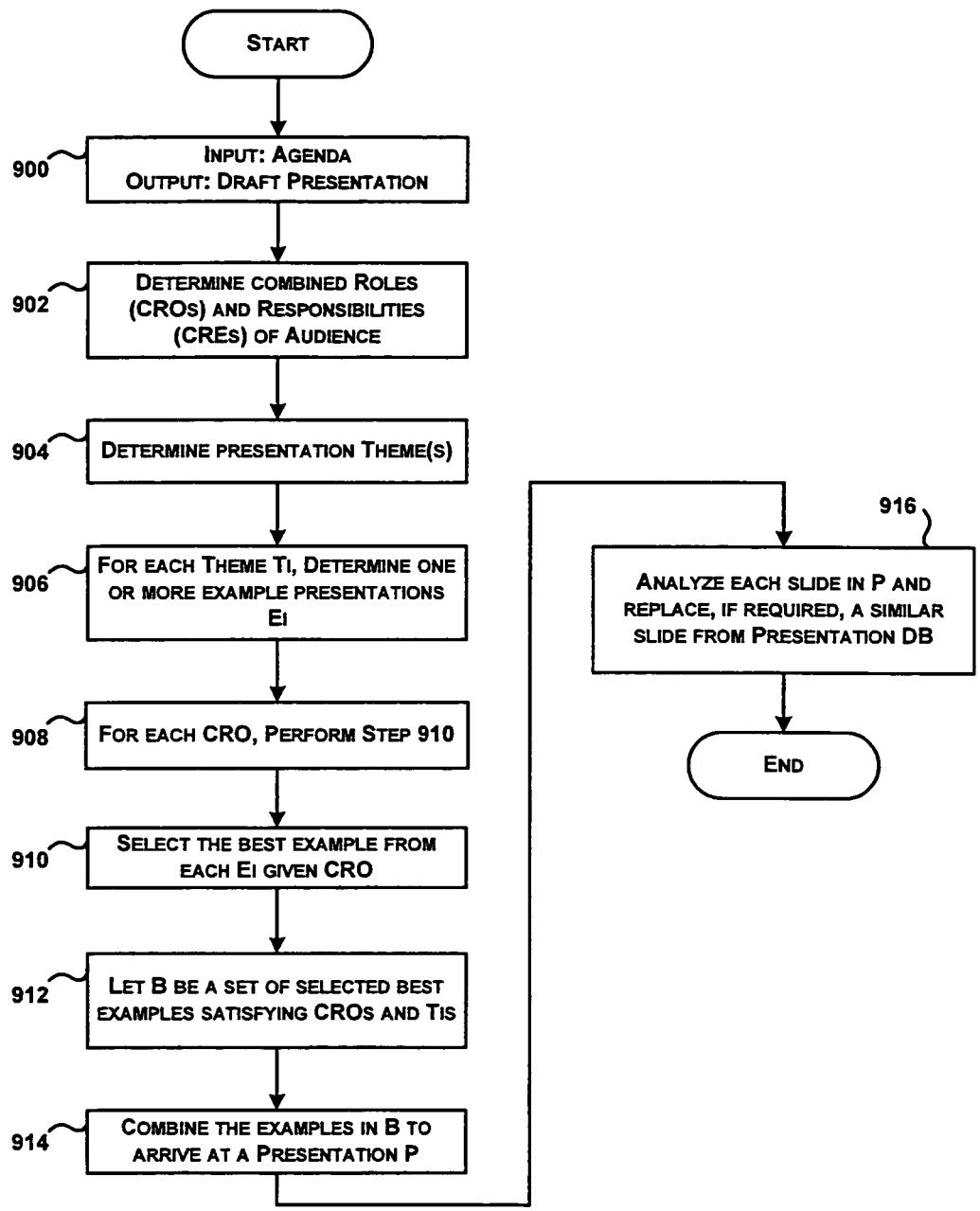
FIG. 9: DRAFT PRESENTATION GENERATION BASED ON ANALOGY

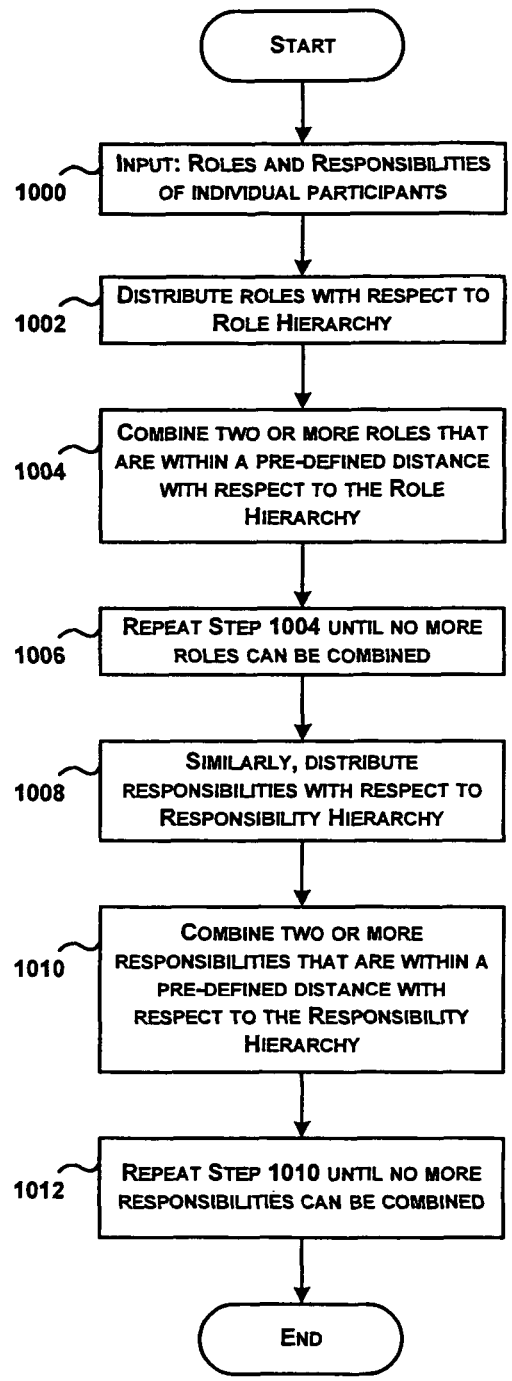
FIG. 10: COMBINING ROLES AND RESPONSIBILITIES

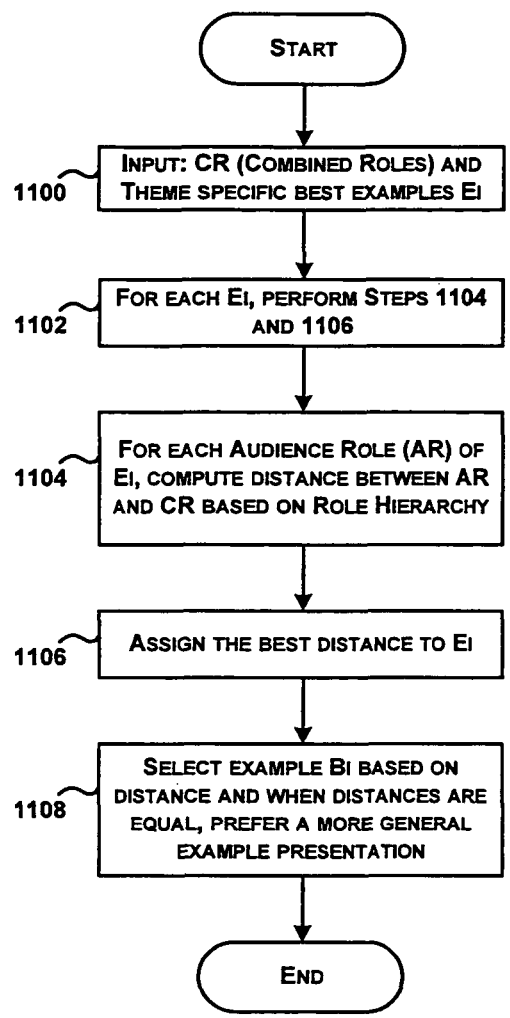
FIG. 11: SELECTING EXAMPLES

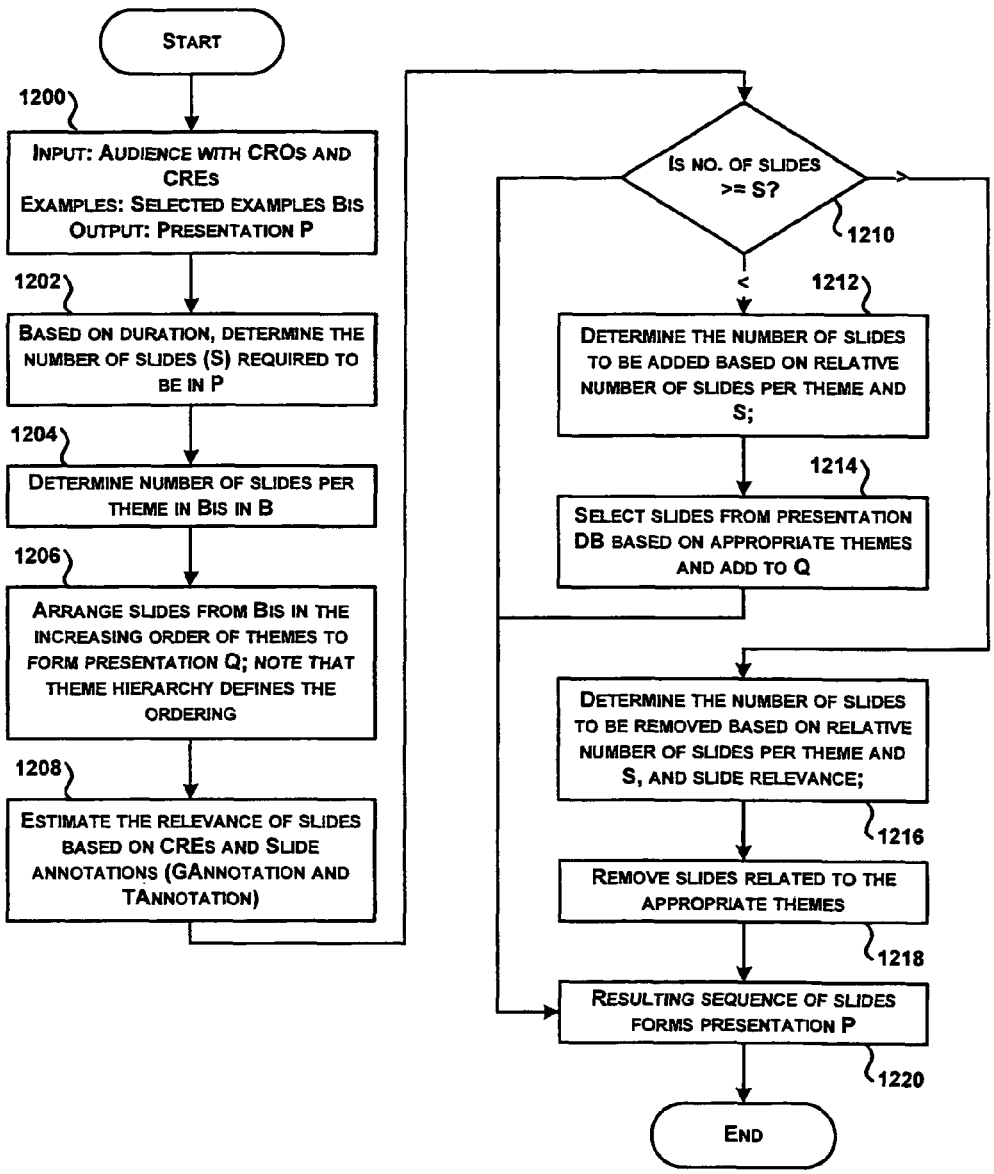
FIG. 12: COMBINING EXAMPLES

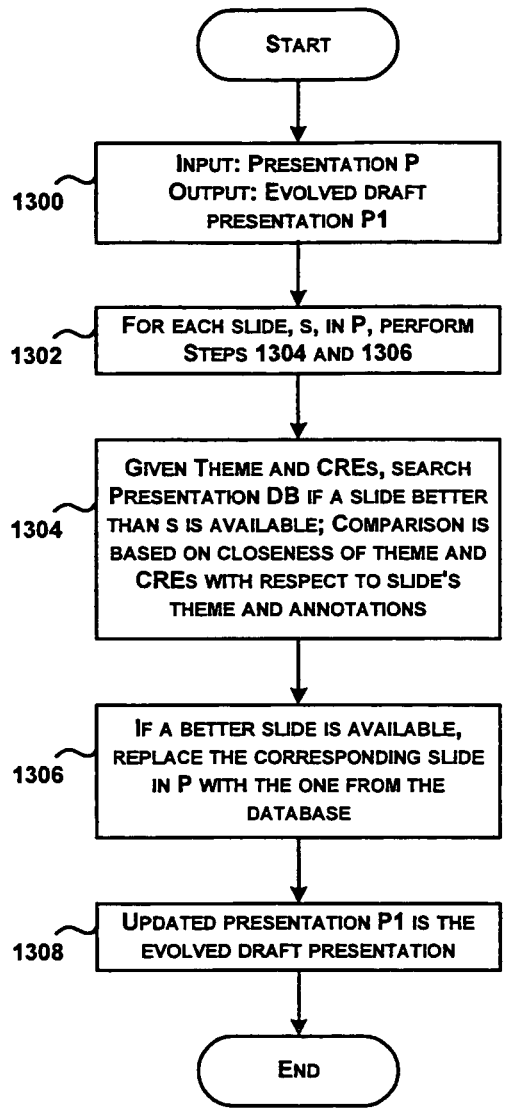
FIG. 13: EVOLVING DRAFT PRESENTATION

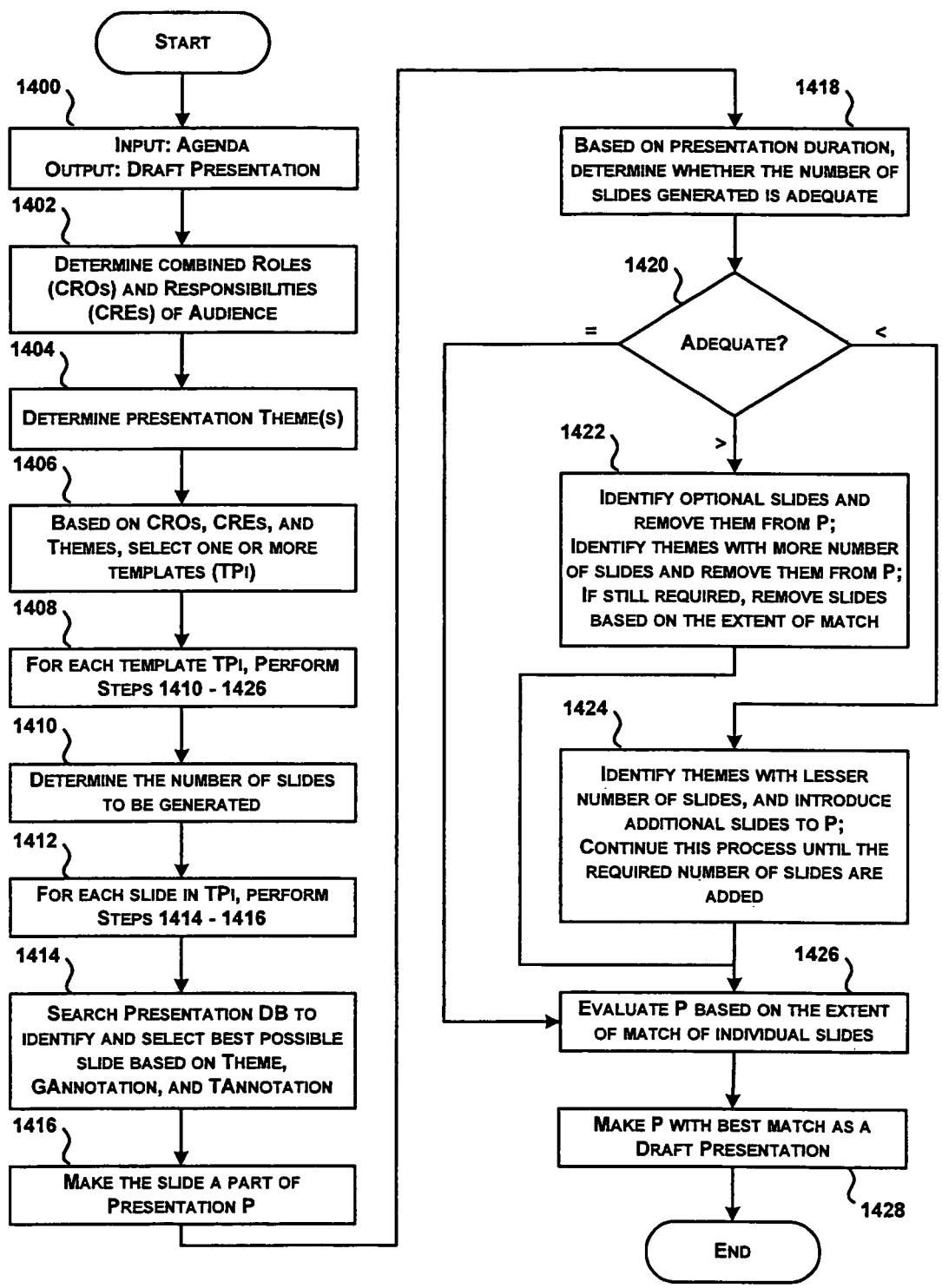
FIG. 14: TEMPLATE BASED PRESENTATION GENERATION

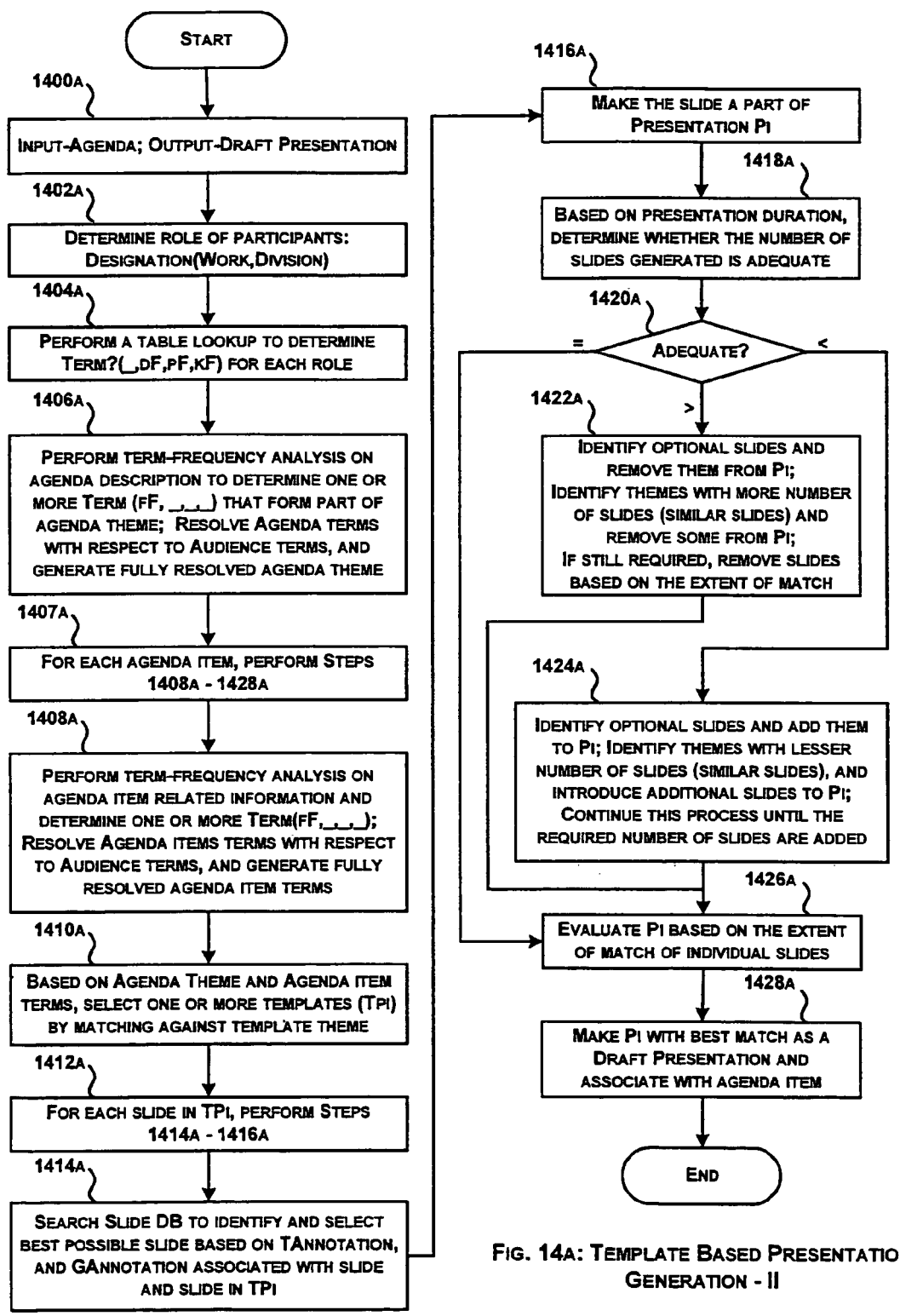
FIG. 14A: TEMPLATE BASED PRESENTATION GENERATION - II

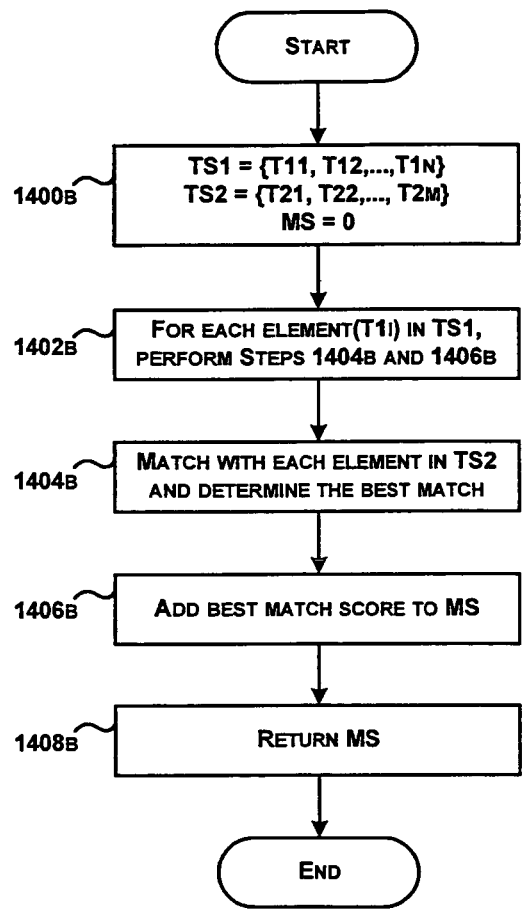
FIG. 14B: TERM-SET MATCHING

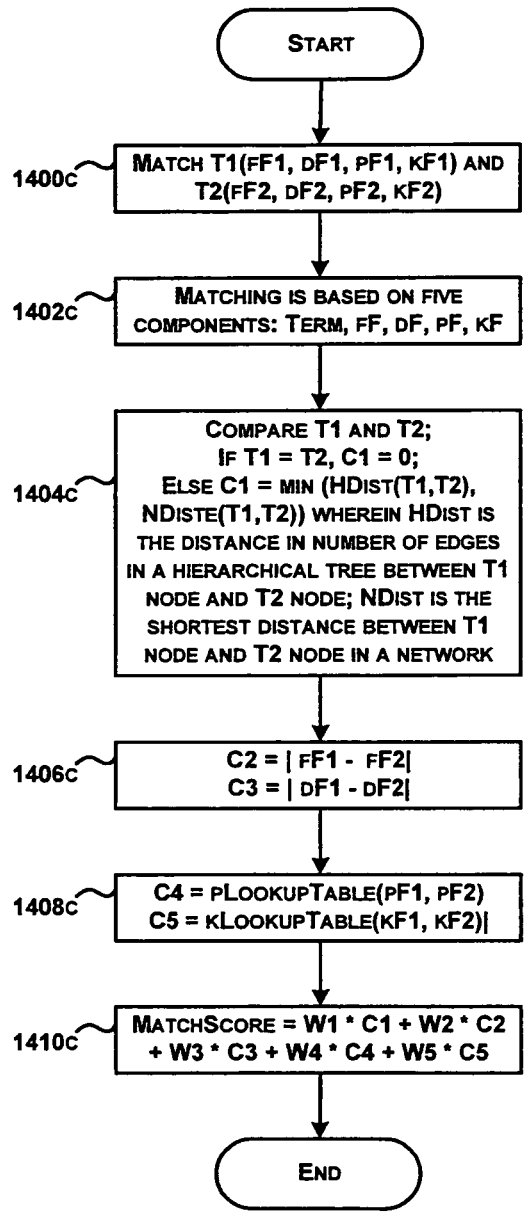
FIG. 14C: TERM-PAIR MATCHING

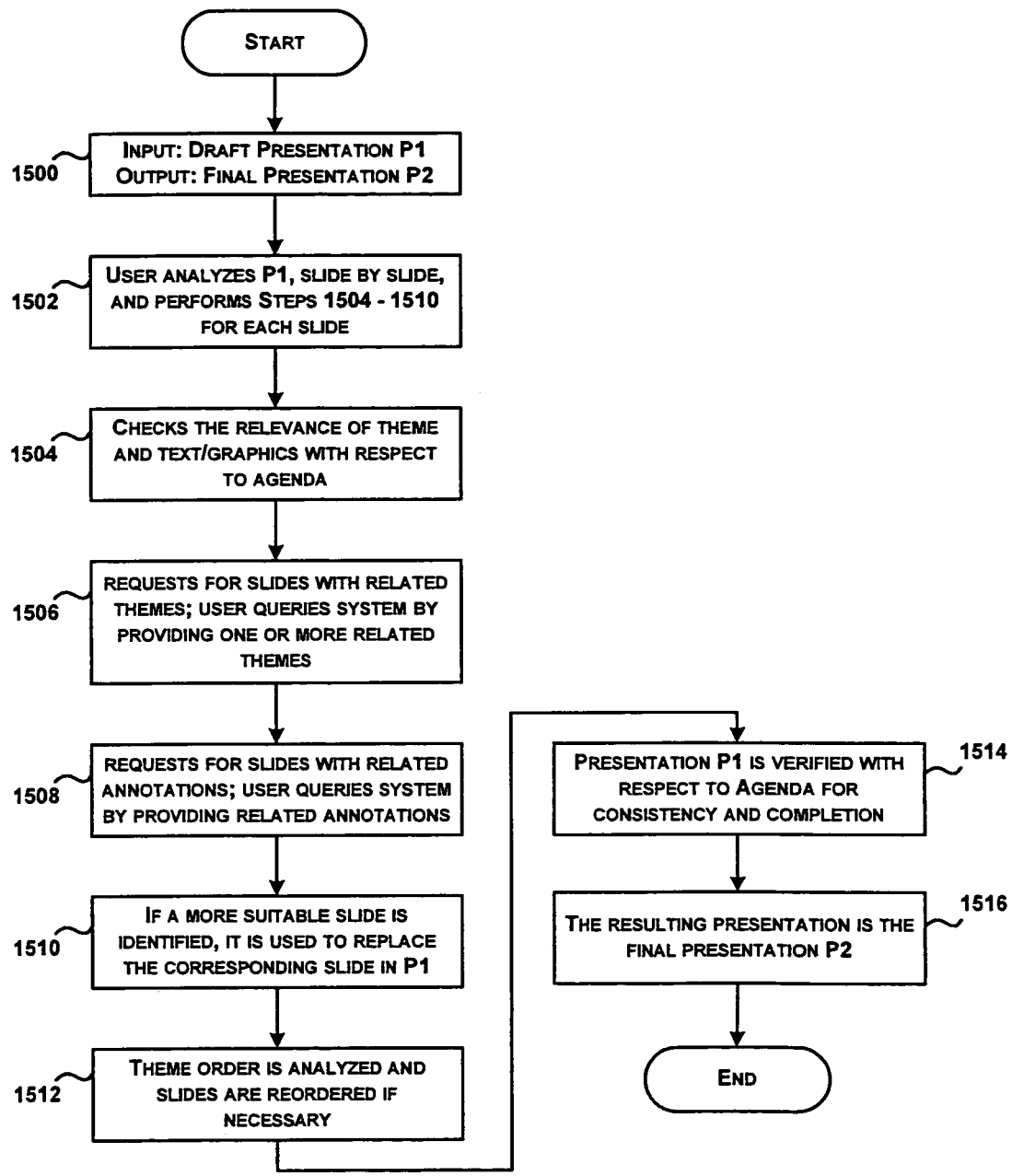
FIG. 15: PRESENTATION TUNING

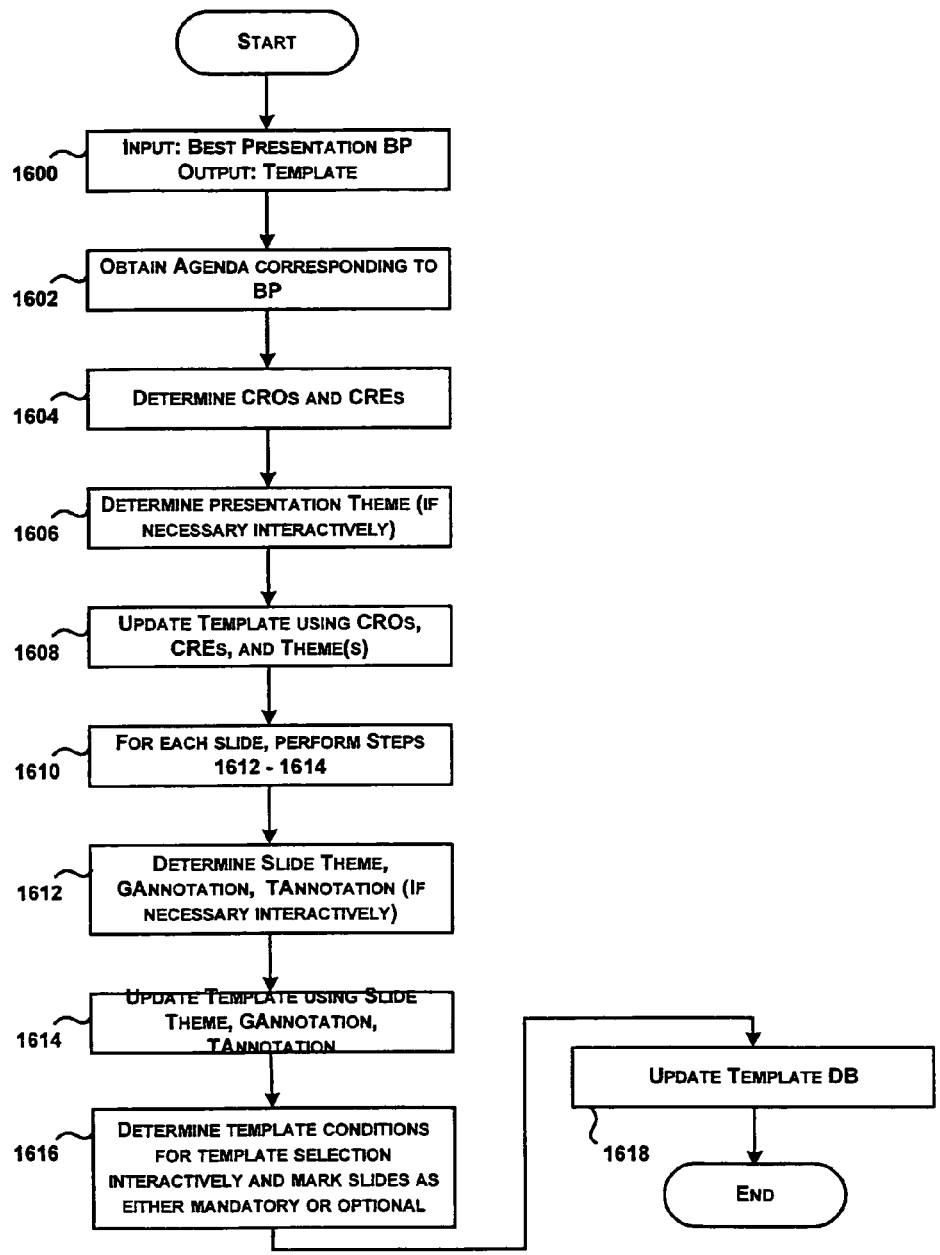
FIG. 16: TEMPLATE GENERATION

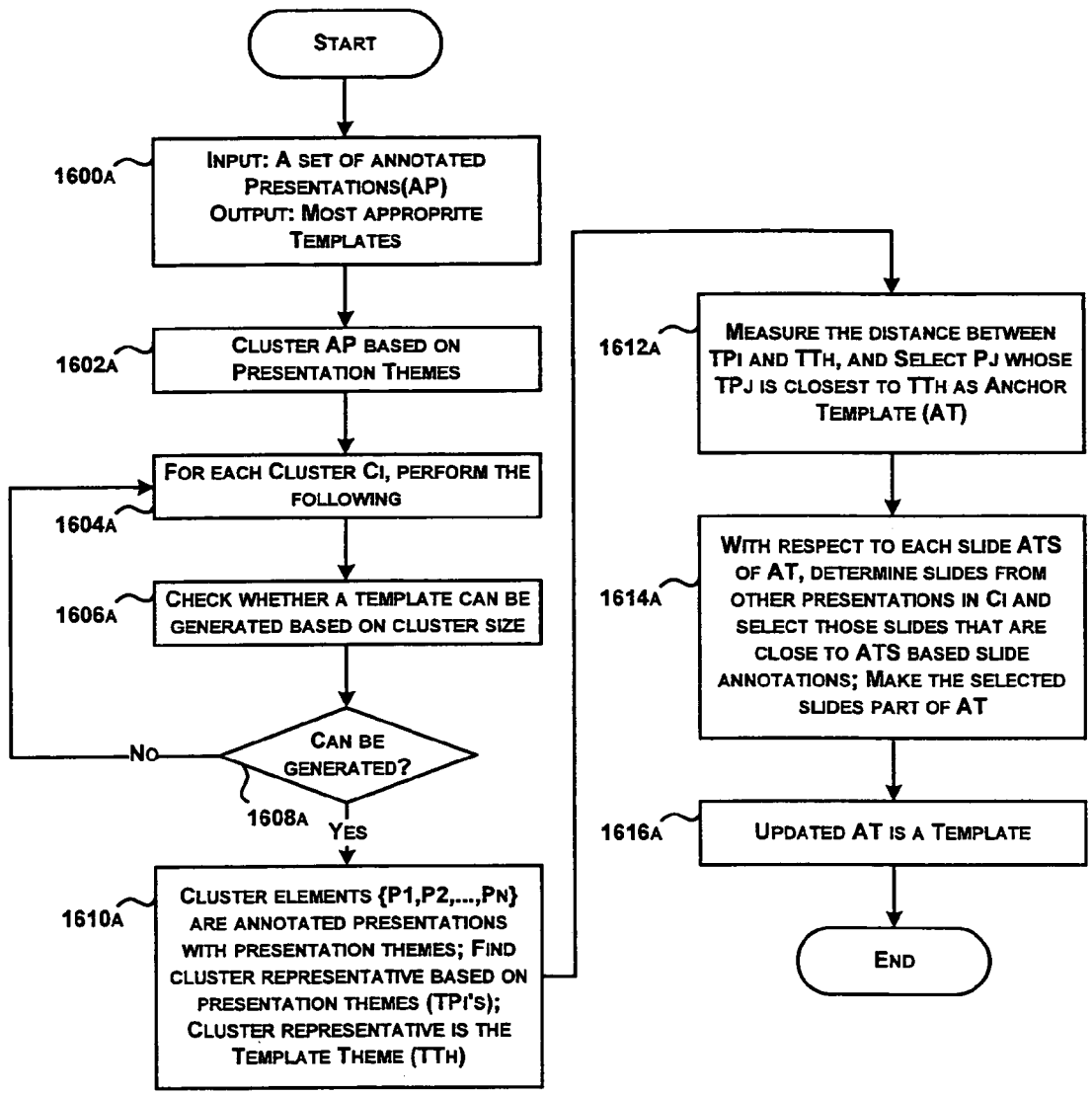
FIG. 16A: TEMPLATE GENERATION - II

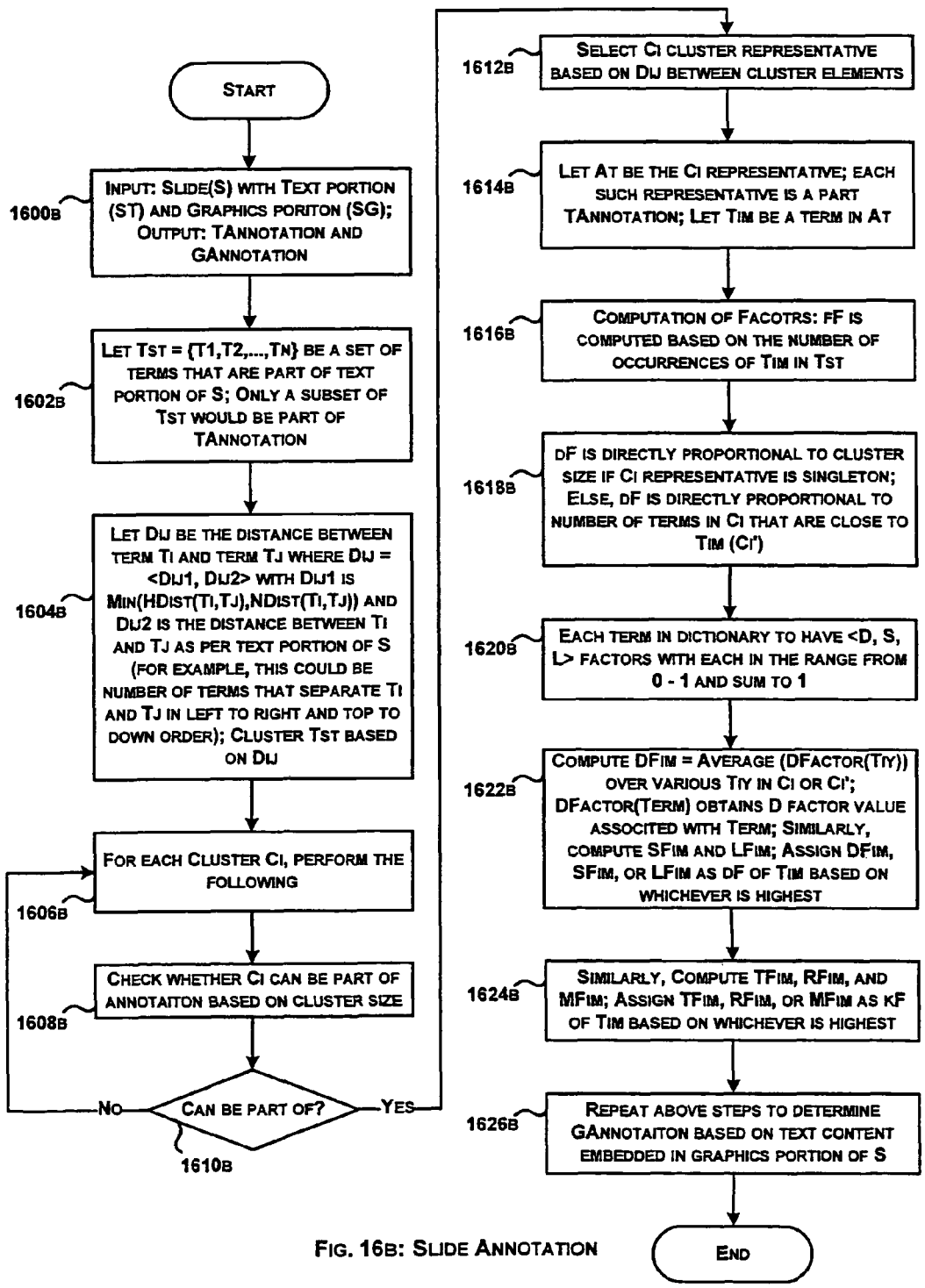
FIG. 16B: SLIDE ANNOTATION

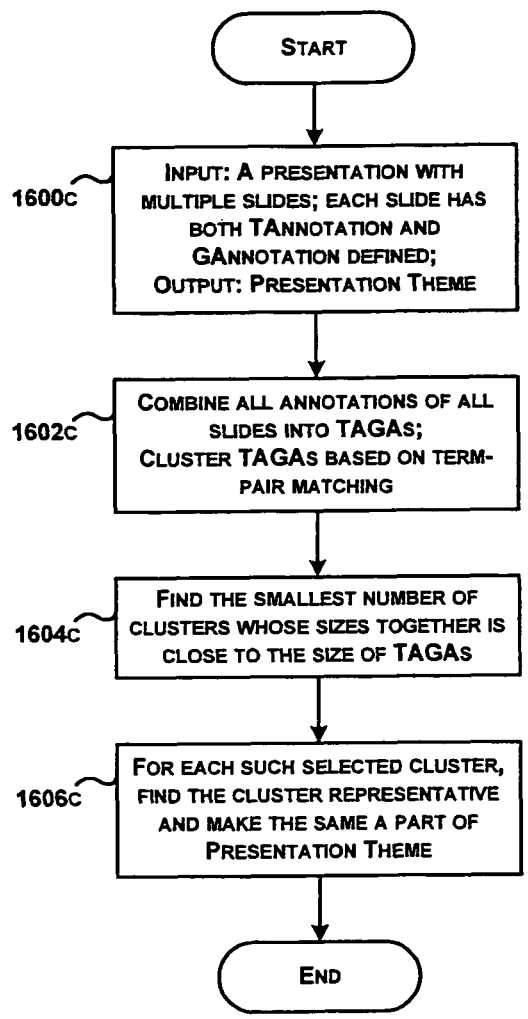
FIG. 16C: PRESENTATION THEME DETERMINATION

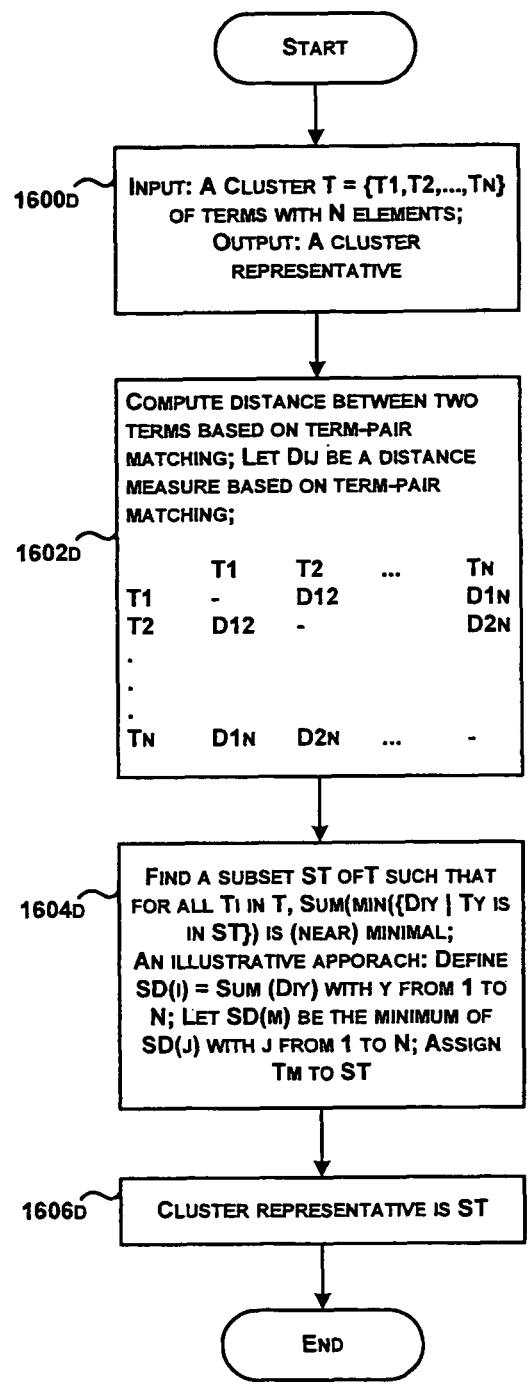
FIG. 16D: CLUSTER REPRESENTATIVE DETERMINATION

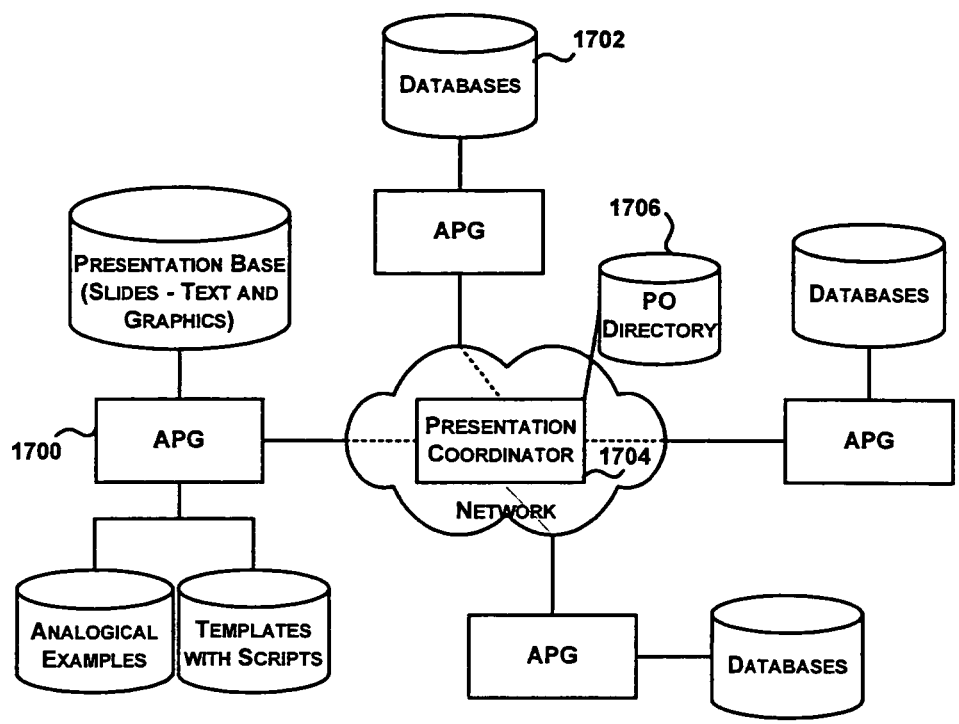
FIG.17: NETWORK BASED APG

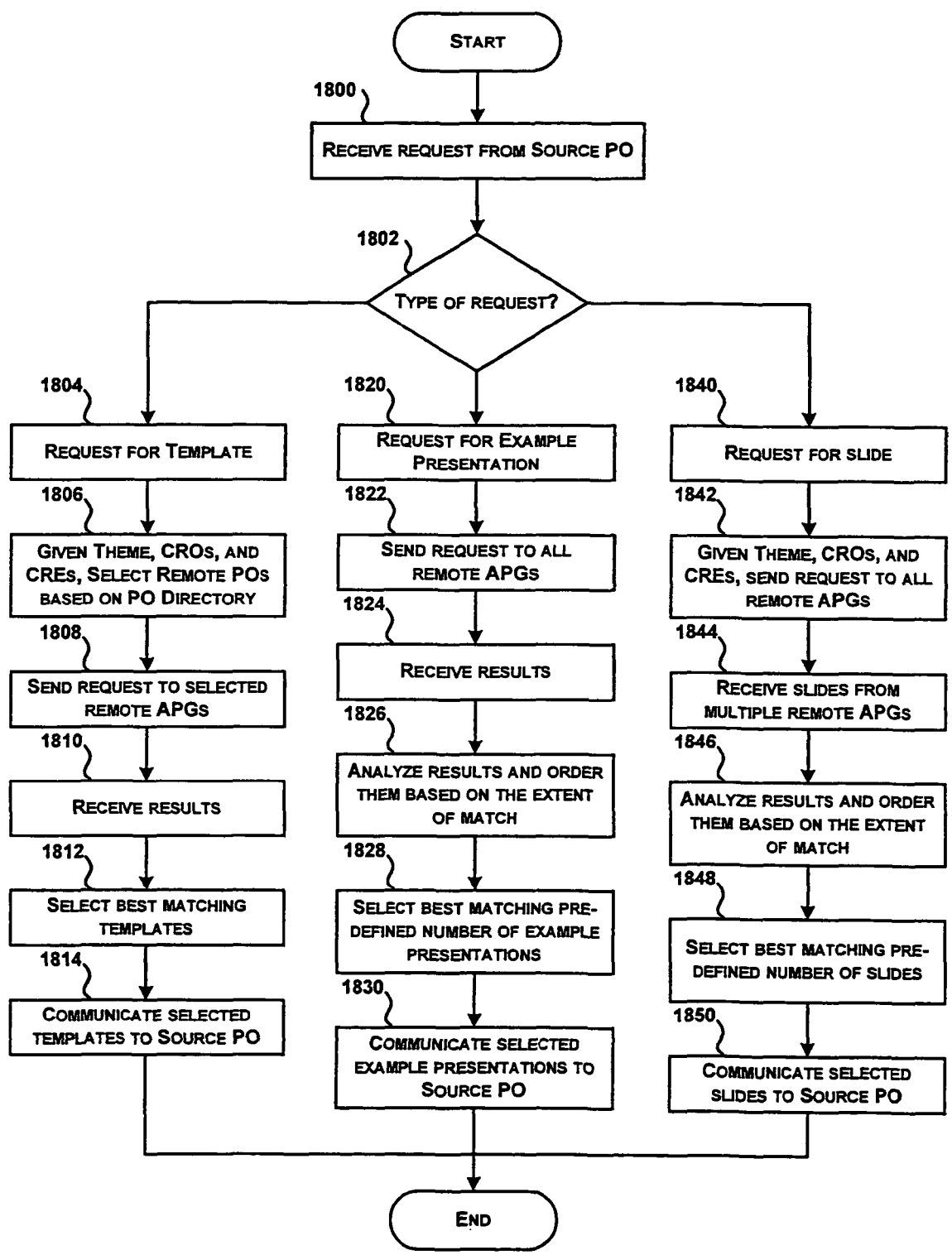
FIG. 18: MULTI-APG INTERACTION

SYSTEM AND METHOD FOR AUTOMATIC GENERATION OF PRESENTATIONS BASED ON AGENDA

CROSS REFERENCE TO RELATED APPLICATION

This application is a continuation-in-part application of U.S. patent application Ser. No. 10/814,927 filed Mar. 31, 2004, and entitled "System and Method for Automatic Generation of Presentations Based on Agenda," the contents of which are incorporated herein by reference.

BACKGROUND OF THE INVENTION

1. Field of the Invention

The present invention relates to the management of presentation material of an enterprise in general, and more particularly, automatic generation of presentation material. Still more particularly, the present invention relates to a system and method for automatic generation of presentation material by analyzing agenda and making use of an enterprise presentation database consisting of annotated analogical examples, templates, and slid gratuitement es.

2. Description of Related Art

Enterprises marketing their products and services meet regularly their clientele and prospects for business promotion purposes. Many times, there are several meetings with a client with different groups and to make the presentations more effective, the presentation material needs to be tuned keeping in mind the group profile. Lack of adequate time to manually prepare a presentation may force the presenter to make best use of his/her experience in delivering the presentation using a slightly out-of-date presentation material. This kind of mismatch between displayed content and articulated content could make the whole presentation somewhat ineffective. An alternative is to deploy a skilled team of professionals to help prepare the right presentation given the group profile. However, even in this case, there may be situations when this team of professionals is busy leading to the use of "what I have" presentation material. This establishes a need for an automatic generation presentation material based on group profile.

A matured or growing enterprise has a collection of presentations made over a period of time with varying successes. An automated system that could use this vast presentation base could help either individual presenters or a skilled team of presentation designers to quickly assemble an adequate number of slides in order that meets the client's expectations. On account of the nature and complexity involved with the automatic generation, it is worthwhile to explore a system that could manage a vast presentation base and generate a fairly acceptable draft version of the presentation material. This draft version can be fine tuned by a presenter, again taking as much assistance from the system as possible. A better organization of the presentation base can help (a) achieve using as much of the available information in as much effective manner as possible; and (b) provide fairly intuitive means of user interactions for fine tuning the presentations. The system can use the experience base of the enterprise in a systematic way by creating several templates that can be used under various circumstances. Templates are a well known way abstracting information for a wider applicability and some of the examples of templates include document template and drawing template. A template contains adequate information about (a) how to evaluate the suitability of a template for a given situation; (b) how to instantiate the various fields of a template with specific data; and (c) how to construct the desired object (such as document or drawing) using template as the basis. Using example presentations is yet another way of providing additional information to the system to help generate presentations for a given situation. Specifically, an example related to a similar situation is retrieved from the presentation base and used as the basis for presentation generation.

U.S. Pat. No. 6,148,330 to Puri; Deepak (San Francisco, Calif.); Yurica; Kevin (San Francisco, Calif.); Marshall; John (Saratoga, Conn.) for "System and method for automatically generating content for a network channel" (issued on Nov. 14, 2000 and assigned to Netscape Communications Corp. (Mountain View, Calif.)) describes a system and method for automatically generating content for distribution via a network channel.

U.S. Pat. No. 6,516,340 to Boys; Mark A. (Aromas, Calif.) for "Method and apparatus for creating and executing internet based lectures using public domain web page" (issued on Feb. 4, 2003 and assigned to Central Coast Patent Agency, Inc. (Aromas, Calif.)) describes a system for creating and conducting interactive lectures via the Internet or other wide-area networks.

U.S. Pat. No. 6,580,438 to Ichimura; Satoshi (Palo Alto, Calif.); Nelson; Lester D. (Santa Clara, Calif.); Pedersen; Elin R. (Redwood City, Calif.) for "Systems and methods for maintaining uniformity in a presentation environment" (issued on Jun. 17, 2003 and assigned to Fuji Xerox Co., Ltd. (Tokyo, JP)) describes a presentation control systems and methods that provide support for manipulating the context of elements within a presentation. Specifically, the systems and methods of this invention receive a request to display a presentation element, for example, a slide. The context of the slide is then manipulated in accordance with a style profile, or template, that can ensure a uniform display characteristic between presentation elements of varying formats.

U.S. Pat. No. 6,684,369 to Bernardo; Richard S. (Needham, Mass.); MacPhee; David A. (San Mateo, Calif.) for "Web site creator using templates" (issued on Jan. 27, 2004 and assigned to International Business Machines, Corporation (Armonk, N.Y.)) describes a software tool for use with a computer system for simplifying the creation of Web sites. The tool comprises a plurality of pre-stored templates, comprising HTML formatting code, text, fields, and formulas that are used during the creation of a web site.

A set of guidelines for authoring effective presentations is mentioned in "Tips for Building Computer-Based Presentations," by Chial Michael R., PhD, University of Wisconsin—Madison. A brief about this prior art is provide in the following. Agenda helps in identifying the subject and manner of approach (Page 2, Section 2). Goal defines the expected impact on the audience members based on the presentation (Page 2, Section 2). The production of a presentation must be based on the right template that fits the defined goal (of presentation), form and format of content, the mode of presentation (such as on-screen or web-browser based), color schemes that avoid contrast and visibility issues, the general principle of simplicity and consistency (Page 4, Section 2.A)

Having put in text and non-text material into slides, it is appropriate to emphasize textual material for visual effects and non-textual material for effects such as color and motion (Page 4-5, Section D). The used template can be edited for template attributes (such as size, placement, or color) for frame-level object attributes, and for misspellings (Page 5, Section E). Also, use alternative presentations (such as cartoons, photographs, or flow charts) for effect (Page 3, Section E). The document helps in planning, producing, and delivering of presentations to audiences using computer-based tools such as PowerPoint. These tools offer excellent features to support organizing, editing, and presenting a variety of media (such as text, audio, or video) (Page 1, Second Paragraph).

The above prior art that provides tips describes how the tools such as PowerPoint can be made use of (a) to incorporate "frames" each of which may contain a mix of text, charts, or other images; (b) to incorporate sound, animations, or movie clips; and (c) to deliver the presentations in various ways such as printed material and self-playing kiosk programs. The tips are meant for human beings who have knowledge and information, and help them relate their knowledge and information to deliver presentations to audiences using computer-based tools. The tips assist in orienting a presentation to purpose, goal, agenda, and audience, and suggest sequencing and prioritizing of ideas and evidence in a way that works well. Having organized and sequenced the content, the tips describe how to present the same keeping in mind multimedia content and visual appeal. In particular, templates help select alternative ways of creating layout for content and content positioning, color schemes, animations, and text formats.

Typically, in a large organization, the knowledge is vastly distributed across the organization. Many a times, presentations are created and delivered by sales force that might not have all the content that is required for presentations within themselves. Further, the time available for planning, content gathering, and content sequencing is very minimal. There are research teams within the organization that generate content for their own presentations and naturally, the organization stands to gain if such collective content could be made use of in every presentation. While the tips suggested in the above mentioned prior art is very useful for individuals who possess knowledge, it is impractical to expect the full utility of such tips in larger organizations. Definitely, these tips are necessary but are not sufficient. The proposed invention is in a direction to fill up this gap and clearly outlines a practical and useful means for addressing the issues related to distributed knowledge and minimal time-to-prepare.

The known systems do not address the issue of automatic generation of presentation material from agenda. The present invention provides with an automatic interactive system to users to input agenda to help generate draft version of a presentation. Also, the present invention provides for fine tuning of the generated draft version of the presentation. Further, the present invention proposes an approach for the generation of templates from "best" presentations.

SUMMARY OF THE INVENTION

The primary objective of the invention is to achieve automatic generation of presentation material to enhance the effectiveness of presentations made to clients and prospects. This is achieved by exploiting the implicit knowledge of the various presentation designers of an enterprise in the form of templates and example presentations. The invention operates in the context of a computer system.

One aspect of the present invention is the management of agenda, audience, and slide details wherein presentation organizer manages the agenda details including theme of a meeting, participant details, and duration, audience details including information about people and their roles and responsibilities, and company details, and presentation slide details including textual and graphical contents, and their annotations.

Another aspect of the present invention is the management of annotations wherein the salient aspects of agenda, audience, slides, presentation examples, and presentation templates are described using a common dictionary describing people, products, and processes based on network and hierarchical representations.

Yet another aspect of the present invention is the draft presentation generation wherein a draft version of a presentation is generated using the most appropriate analogical presentation examples.

Another aspect of the present invention is an alternative way of draft presentation generation wherein a draft version of a presentation is generated using the most appropriate presentation templates.

Yet another aspect of the present invention is to provide a method for template generation wherein a template is automatically generated based on a presentation.

Another aspect of the present invention is to provide a method for annotating slides wherein slides are automatically annotated based on textual content.

Yet another aspect of the present invention is to provide for a method for determining presentation theme wherein presentation theme is identified automatically based on annotations associated with the slides of a presentation.

Still other desirable features of the invention will become apparent to those of ordinary skill in the art upon reading and understanding the following detailed description, taken with the accompanying drawings, wherein like reference numerals represent like elements throughout.

BRIEF DESCRIPTION OF THE DRAWINGS

FIG. 1 depicts the architecture of the Automatic Presentation Generation (APG) system;

FIG. 2 depicts the key elements of APG system;

FIG. 3 depicts the main components of Presentation Organizer subsystem;

FIG. 3A depicts a typical workflow of APG system;

FIG. 4 provides a brief description of the various databases of APG system;

FIG. 5 describes the procedures related to Agenda management;

FIG. 6 describes the procedure related to Audience management;

FIG. 7 describes the procedure related to Slide management;

FIG. 8 provides a brief description of the additional databases of APG system;

FIG. 8A depicts the typical representation of a template;

FIG. 8B depicts an illustrative representation of a dictionary, template, agenda, and audience;

FIG. 8C depicts illustrative lookup tables;

FIG. 9 describes the procedure related to the generation of draft version of a presentation based on analogical examples;

FIG. 10 describes the procedure related to the combining of roles and responsibilities;

FIG. 11 describes the procedure related to the selection of examples based on combined roles;

FIG. 12 describes the procedure related to the combining of examples based on combined responsibilities;

FIG. 13 depicts the procedure related to the evolving of an initial draft version of a presentation;

FIG. 14 describes the procedure related to the generation of draft version of a presentation based on templates;

FIG. 14A describes an additional procedure related to the generation of a draft version of a presentation based on templates;

FIG. 14B describes a procedure related to the matching of two term sets;

FIG. 14C describes a procedure related to the matching of two terms;

FIG. 15 describes the procedure related to the tuning of the generated presentation;

FIG. 16 describe the procedure related to the generation of templates;

FIG. 16A describes an additional procedure related to the generation of templates;

FIG. 16B describes the procedure related to slide annotation;

FIG. 16C describes the procedure related to presentation theme;

FIG. 16D describes the procedure related to cluster representative determination;

FIG. 17 depicts the architecture of a network based APG system; and

FIG. 18 depicts the interaction among multiple APGs.

DESCRIPTION OF THE PREFERRED EMBODIMENTS

FIG. 1 depicts the system architecture of Automatic Presentation Generation (APG) system consisting of Presentation Organizer (PO), Presentation Tuning (PT), and Template Generation (TG) subsystems. The main objectives of APG system are to (a) organize the various presentation material within an enterprise; (b) construct a draft version of the presentation based on an agenda; (c) provide a framework for fine tuning of the generated presentation interactively by users; and (d) enhance the richness of stored presentation using the best presentations. Typically, in enterprises, many presentations are made to visiting clients and prospects. These presentations are created manually by the staff members of the enterprise. Such a manual procedure depends on knowledge, skill, and experience of the individuals and these aspects typically vary from person to person. Furthermore, the quality of the presentation also depends on the amount of related information (such as past presentations and case studies) available. The APG system helps individuals by providing them with an almost acceptable draft presentation that can be tuned by using the same system. The generation of such a draft presentation is based on using as much of the past success stories as possible and this information is in the form of (a) example presentations; and (b) presentation templates. The relevant information from Presentation Base is selected based on agenda and audience profile. This helps identify those information that are most relevant and most recent in order to create an almost acceptable presentation material. The Presentation Base is organized in terms of slides and a slide is considered as the basic unit of a presentation material. There are two kinds of information that a slide can contain, namely, text and graphics. In order to assist in selection, slides are annotated and these annotations can be as much categorical as appropriate to help in achieving more accurate selection. During presentation tuning, the system provides help in the form of (a) selecting alternative slides for replacement; (b) selecting slides based on a more specific theme; (c) displaying slides that are similar to the selected slide; and (d) displaying equivalent text and graphic components based on a theme. Uses also interact with the system during template generation, based on best illustrative presentations, by appropriately providing (a) annotations; and (b) themes.

100 depicts Presentation Organizer (PO) subsystem that takes agenda and audience profile as input and with help of Presentation Base (102), analogical examples (104), and presentation templates (106) to generate a draft version of a presentation. 108 depicts Presentation Tuning (PT) subsystem that takes the generated draft presentation as input and interactively with appropriate user inputs generates a final version of the presentation. Finally, 110 depicts Template Generation (TG) subsystem that takes "best" presentation as input and interactively with appropriate user inputs and generates a presentation template that is stored in a database (106). Note that certain presentations are also stored in a database (104) to use the same as analogical examples during presentation generation process.

FIG. 2 provides a brief description of the various key elements of APG system. The system is based on five critical elements (200), namely, agenda, audience, slides, analogical examples, and templates. A typical slide consists of (a) opening title; (b) text; (c) graphics; and (d) closing remarks (202). All the key elements are annotated using a common dictionary of terms in order to help relate each other (204). Such relationships between terms are represented using hierarchical and network based structures and specifically, an annotation of a text portion or graphics portion of a slide is represented using hierarchical or network structure. The common dictionary describes the various attributes that are related to people, products, and processes. For example, audience information annotation makes use of people attributes to describe participants, process attributes to describe their roles, and client information is annotated using product related attributes.

FIG. 3 describes the major modules of PO subsystem. There are six modules (300) and each performs a distinct functionality to collectively realize the overall functionality of PO subsystem. Agenda management module (302) manages the various agendas that are processed by APG system. The module also maintains a relationship between agenda and the generated presentations. Agendas are one of the important triggers for generating draft presentations. Note that, during the course of time, the agendas could get revised leading to the generation of new draft presentations. Audience management modules (304) deal with participants of a particular meeting, and their roles and responsibilities. As presentations are directed to audience, it is important to have accurate information with respect to the participants. Roles help in selecting the most suitable presentation examples from a database while responsibilities help in selecting the most appropriate slides from an example. Observe that an example may have multiple slides and not all of them are relevant given the roles and responsibilities of the participants. Slide management (306) manages the various slides that are part of the enterprise presentation base. Individual slides depicting various themes such as case studies are developed and are independently put into Presentation Base. Such a collection forms an important component of the enterprise's knowledge base. This module helps in creating and maintaining the slides with both text and graphics annotations and theme. Analogy-based generation module (308) generates several candidate presentations based on similar examples. Specifically, given an agenda and a theme, several example presentations contained in Analogical Examples database are identified and the appropriate ones are selected to subsequently generate the draft version of a presentation. Template based generation (310) is an alternative approach for generating draft version of a presentation. In this approach, based on an agenda and a theme, multiple templates from Templates database are selected and the best of the selected templates is used to help generate the draft version of a presentation. Finally, Draft Presentation Evolution (312) module refines the generated draft version of a presentation using slides present in Presentation DB to generate a refined draft version of a presentation.

FIG. 3a describes a typical workflow related to APG system. The workflow depicts the activities performed by a user and the major functions of the subsystems of APG system and indicates draft presentation generation and tuning, and the role of best presentations in template generation.

FIG. 4 provides a brief description of a few important elements of the major databases of APG system. 400 represents agenda information format and consists of information such as visiting client details, details of participants (such as their roles and responsibilities), and presentation details (such as topic and duration). 402 details agenda database that is based on the agenda information format. 404 represents client information related database and consists of information such as client description and annotation. The annotation is based on a common dictionary and provides structured information about the client. 406 provides audience related information and consists of information such as roles and responsibilities. 408 depicts information related to slide database and consists of information such as primary and secondary themes, text and graphics contents, and annotations. 410 represents information related to theme database and consists of information such as theme annotation. Note that all annotations are based on a common dictionary to enable the automatic processing and generation of presentations.

FIG. 5 describes the procedures related to agenda management. Agenda forms one of the important inputs (500) to APG system and different agendas maintained in the agenda database helps in relating generated presentations with agendas. If the input agenda is a new agenda (502), the agenda is validated for the information consistency (510) and is analyzed to extract client information (512). Further analysis is undertaken to obtain participant information, and their roles and responsibilities (514), and information related to presentation themes (516). The obtained information from the input agenda is used to update Agenda database (518). If the request is for modifying an existing agenda (502), the input changes are validated (520). The input is analyzed to obtain changes in client information (522), changes in audience information (524), and presentation information (526). The changes are updated onto Agenda database (528). If a presentation has already been generated based on old agenda, the same is invalidated to reinitiate the presentation generation process (530). If the request is for deleting an existing agenda (502), the input agenda is located in Agenda database and the same is deleted (530).

FIG. 6 describes the procedures related to audience data management. The input audience data (600) is analyzed and checked for the nature of request (602). If the request is related to new audience information, client and audience related information is obtained (610). For each participant that is part of the audience data, Step 614 is performed (612). The roles and responsibilities of a participant are validated using a role and responsibility hierarchy (614). The validated audience information is updated onto the audience database (616). If the request is related to the modification of an existing audience information (602), client and audience related information is obtained (620). For each new participant that is part of the audience data, Steps 624 and 626 are performed (622). In Step 624, the roles and responsibilities of a participant are identified and validated. The valid participant information is added to Audience database (626). For each existing participant that is already a part of audience database, Steps 630 and 632 are performed. In Step 630, the roles and responsibilities of a participant are identified and validated. The valid participant information is used to replace the corresponding information Audience DB (632). Remove any participant that is part of the audience database and is not part of audience data (634). The validated data is updated onto Audience database (636). If the request is related to the deletion of an existing audience data (602), audience data consisting of client and participant information are identified (640) and audience data is removed from the audience database (642).

FIG. 7 describes the procedures related to slide data management. The input slide data and associated request is analyzed. If the request is related to a new slide data (702), primary and secondary themes related to the slide are determined (710). Note that each slide has a unique theme and this aspect is exploited while selecting a slide for making the same part of a presentation. The two themes (primary and secondary) are required to be consistent with each other and the input themes are analyzed for their consistency (712). Each slide can have either text portion alone, graphics portion alone, or both. And both text and graphics are annotated appropriately to capture the salient aspects of the slide. Note that these annotations are done manually and are associated with the slide. As both text and graphics convey the same theme, TAnnotation (text annotation) and GAnnotation (graphics annotation) should be consistent with each other and with respect to a common dictionary (714). The validated data in updated onto Slide database (716). On the other hand, if the requested action is to modify an existing slide data (702), primary and secondary themes are identified (720) and are validated for consistency (722). Further, GAnnotation and TAnnotation are validated with respect to each other and with respect to a common dictionary (724) and if there is change in theme information, the old information is deleted and new information is added onto Slide database (726). Otherwise, Slide database is updated with the validated information (728). If the requested action is to delete slide data (702), the corresponding slide ID is determined (730) and the slide data is deleted from Slide database (734).

FIG. 8 provides a brief description of a few more databases of APG system. 800 represents Example database and consists of information such as client details, audience details, and presentation details. The Example database consists of typical presentations that are used as basis for generating draft presentations. The individual slides of an example presentation are stored in ExampleSlides database (802). 804 details template related information and consists of information such as roles and responsibilities. 806 provides the information related to the individual slides of a template.

FIG. 8A provides a brief description of template representation. A scripting language is used to describe the various aspects of a template. 850 depicts the conditions that enable the selection of a template based on information such as roles, responsibilities, and themes. Note that some templates can be generic and some can be specific, and this nature of a template is based on how loose/strict the conditions are. 852 describes the typical range of number of slides in the generated draft version of a presentation and based on presentation duration, an appropriate number of slides that is within the range is determined. Templates also provide guidance on slide order within a presentation (854). A slide defined within a template is either mandatory or optional. Mandatory slides defined within a template are a must in a presentation that is based on the template and is described using the various aspects of a slide such as Theme, TAnnotation, and GAnnotation (856). Optional slides defined within a template are optionally included in a presentation that is based on the template and is described using the various aspects of a slide such as Theme, TAnnotation, and GAnnotation (858).

FIG. 8B depicts an illustrative representation of a dictionary, template, agenda, and audience. There are five distinct aspects: (a) Dictionary describing the various terms of a vocabulary along with their description and attributes; (b) Dictionary defining hierarchical relationship among the described terms; (c) Dictionary defining network relationship among the described terms; (d) Slide description; and (e) Template description. In order to help select the best template for generating a presentation, slides described in a template need to be elaborated as well. There are three aspects in describing a slide: (a) slide theme; (b) TAnnotation providing information about textual content of the slide; and (c) GAnnotation providing information about the graphics information associated with the slide. An annotation is described using terms drawn from the dictionary; further, the terms are qualified with four attributes: term(fF, dF, pF, kF) wherein fF is frequency factor, dF is detail factor, a value between 1 and 9, pF is a value selected from {D(Product), S(Process), L(People)}, and kF (knowledge factor) is a value selected from {T(Technology), R(Research), M(Market)}. Note that typically, Template theme is a collection of terms with <fF, dF, pF, kF>; and Slide theme is a collection of terms with <fF, dF, pF, kF>. Further, TAnnotation is a collection of terms with <fF, dF, pF, kF> and GAnnotation is a collection of terms with <fF, dF, pF, kF>.

Agenda provides information about a meeting for which presentations are to be prepared, and contains information (such as theme, description, and duration) related to each of the presentations. From this, the terms of the form Term(fF, _, _, _) need to be extracted. In this case, fF is based on the number of times Term appears in the agenda. And, the value of "_" for a factor means that the factor needs to be resolved based on the same factor value in yet another term. Audience information is captured in the form of designation, area of work, and division of work: Designation(Work, Division) that captures the essence of role information; role hierarchy describes the relationship among designations. From this, the terms of the form Term?(_, dF, pF, kF) need to be generated. Term? matches with any resolving term. Agenda and Audience information are combined to form fully defined terms. "?" in a term is a wild-card character. Note that the description of an agenda provides information about the terms in the agenda theme while the terms related to agenda items are based on the information about these agenda items.

FIG. 8C provides illustrative lookup tables. These tables bring out (a)) roles relating to dF, pF, and kF; (b) distance between pF values, namely, Product, Process, and People; and (c) distance between kF values, namely, Technology, Research, and Market.

FIG. 9 describes the procedure for the generation of a draft presentation based on analogy. The draft presentation generation is based on an agenda (900). Agenda provides information about people who are likely participate in a meeting and it is appropriate that the presentation makes an impact on these participants. Hence, the roles and responsibilities provide the needed information to prepare a targeted presentation. Determine the roles and responsibilities of the audience and combine them appropriately using related hierarchical information (902). Such combined roles and responsibilities provide a generic description of multiple participants leading to the presentation with "right" content (instead of being too specific for one and totally unrelated for the rest). Many times multiple perspectives, based on multiple themes, are required to be covered in a presentation. Determine the theme or themes of the presentation (904). For each theme, determine one or more example presentations (906). The objective is to select those example presentations that are based on similar themes and further analyze the example presentations based on roles of the participants to select the best possible example presentations. This analysis is based on roles of the participants and for each of the combined roles of the participants (908), best of the theme based example presentations are selected (910). Determine the selected best examples satisfying both theme and roles (912). Combine the multiple best examples to arrive at a draft version of the presentation (914). Finally, analyze the slides in the generated draft presentation to incorporate better suited, most recent slides from the presentation base (916).

FIG. 10 describes the procedure for combining roles and responsibilities. Input is the roles and responsibilities of individual participants (1000). The objective in generating combined roles and responsibilities is to (a) avoid individual participant-wise processing; and (b) avoid generation of over focused or too specific presentations. The roles and responsibilities are combined by making use of respective hierarchies. As a first step, the roles of the participants are distributed with respect to a role hierarchy (1002). Based on the hierarchy, a notion of distance is defined with respect to the roles of the participants. Combine the two or more roles that are within a pre-defined distance from each other (1004). Such combining of roles is continued until all the roles are accounted (1006). Similarly, responsibilities are distributed with respect to a responsibility hierarchy (1008), and are combined (1010, 1012).

FIG. 11 describes the procedure for selecting example presentations based on the roles of participants. Each example presentation has related audience roles information and this information is used in the selection process. Input is a combined roles and a set of example presentations (1100). For each input example presentation (1102), perform Steps 1104 and 1106. Determine the distance between the combined role and role as described in the example presentation using a role hierarchy (1104). Due to the hierarchical nature of the relationship among the roles, the distance between to roles is defined as the path length between the two roles. Assign the weighted sum of distances between each of audience roles of an example presentation and the combined role as the best distance to the example presentation (1106). Finally, select one of the examples based on their closeness to the input role (1108).

FIG. 12 describes the procedure for combining examples to form a draft version of a presentation. The objective is to combine several best presentations to arrive at the most suitable presentation. The combining is based on responsibilities of the participants (1200). The draft version of the presentation need to have the right number of slides and an approximate number of slides is determined based on the duration (1202). Each slide in each of the example presentations contains the slide theme and this gives an opportunity to combine the various slides of the various presentations. The number of slides per theme is determined (1204), and these slides are grouped based on the slide theme and ordered (1206). This grouping and ordering helps in a systematic processing of slides giving equal importance to the various themes. Estimate the relevance of the slides based on CREs and slide annotations, namely, TAnnotatoin and GAnnotation (1208). If there are lesser number of slides than what is approximately required (1210), determine the number of slides to be added based on relative number of slides per theme (1212). Select the slides from Presentation database based on these themes (1214). On the other hand, if the number of slides is more than what is approximately required (1212), determine the number of slides to be removed based on the relative number of slides per theme and slide relevance (1216) and remove them (1218). The resulting sequence of slides forms the draft version of the presentation (1220).

FIG. 13 describes the procedure for enhancing the generated draft version of a presentation. The objective is to use the slides that are part of the example presentations as the baseline and to search the presentation database for better equivalent slides. Input is the draft version of a presentation (1300). For each slide in the draft version of the presentation (1302), Steps 1304 and 1306 are performed. Based on slide theme and combined responsibilities of the participants, slides similar to a slide in the draft presentation are located in the presentation base (1304). The located slides are compared with the slide in the draft presentation based on annotations and themes. If one of the located slides is better, use the same to replace the slide in the draft presentation (1306). The updated the presentation is the evolved draft presentation (1308).

FIG. 14 describes the procedure for template based presentation generation. The input for template based presentation is an agenda for a meeting (1400). Based on the agenda, determine the combined roles and responsibilities of the participants (1402), and the presentation themes (1404). Search the template database using the combined roles and responsibilities, and themes, and determine the best possible templates (1406). For each of the best templates, perform Steps 1410 through 1426 (1408). Based on duration, determine the number of slides that are required to be part of the presentation (1410). For each slide in a template, perform Steps 1414 and 1416 (1412). Search presentation database to identify and select the best possible slide based on the (a) presentation theme; (b) slide theme; (c) TAnnotation; and (d) GAnnotation (1414). Make the best slide a part of the draft version of the presentation being generated (1416). Based on the presentation duration, determine whether the number of slides generated are adequate (1418). If more number of slides have been generated (1420), then identify optional slides and remove as many of them as necessary, identify themes with relatively more number of slides and remove as many of them as necessary, and identify slides with not so good match and remove as many of them as necessary (1422). On the other hand, if less number of slides have been generated (1420), identify themes with relatively lesser number of slides and introduce additional slides into the draft version of the presentation being generated (1424). Evaluate each of the generated presentation based on the extent of match of the individual slides (1426). Make the generated presentation with the best match as the draft version of the presentation (1428).

FIG. 14A describes an additional procedure for template based presentation generation. The input for template based presentation is an agenda for a meeting (1400a). Determine the role of the participants of the meeting (1402a). A role is described as a Designation(Work and/or Division) wherein the various designations form part of a role hierarchy and also provide information about the amount and nature of information expected during presentations that are part of the meeting. Perform a table lookup to determine a possible value for the following factors: detail factor (dF), product/process/people factor (pF), and knowledge factor (kF) (1404a). The table is organized so as to be able to obtain this information based on designation, area of work, and division of work. Agenda contains information about each of the presentations in the form of presentation title and subtitles. Perform term-frequency analysis on agenda description to determine one or more Term (fF, _, _, _) that form part of agenda theme; Resolve Agenda terms with respect to Audience terms, and generate fully resolved agenda theme (1406a). For each agenda item, perform Steps 1408a-1428a. Perform term-frequency analysis on agenda item related information and determine one or more Term(fF, _, _, _); Resolve Agenda items terms with respect to Audience terms, and generate fully resolved agenda item terms (1408a). Note that at this stage, agenda terms have term and fF resolved, and audience terms have dF, pF, and kF resolved. Resolve each set of agenda terms with audience terms, and generate fully resolved terms that collectively describe the information of relevance to audience given agenda. For each Agenda Item, perform Steps 1408a-1428a (1407a). Based on Agenda Theme and Agenda Item terms, select one or more templates (Tpi) by matching against template theme (1410a). For each slide in the selected template (TPi), perform steps 1414a-1418a (1412a). A template provides information about number of slides and slide order. Slide order is described as a finite state machine with identified start (first) and end (last) slides, and non-deterministic transitions lead to the generation of one or more slides. Search Slide DB to identify and select best possible slide based on TAnnotation, and GAnnotation associated with slide and slide in TPi (1414a). Make the slide a part of the presentation Pi (1416a). Based on presentation duration, determine whether the number of generated slides is adequate (1418a). If there are more slides (1420a), identify optional slides and remove them from Pi; identify themes with more number of slides, remove some of them from Pi; if still required remove slides based on extent of match (1422a). If there are lesser number of slides (1420a), identify themes with lesser number of slides and introduce additional slides to Pi; continue this process until the required number of slides are added (1424a). Evaluate Pi based on the extent match of individual slides (1426a). Make Pi with best match as a draft presentation and associate with Agenda Item (1428a).

FIG. 14B describes a procedure for matching term sets. Let two term sets be TS1={T11, T12, ..., T1n} and TS2={T21, T22, ..., T2m} (1400b); MS defines the overall match score and is set to 0. Matching involves matching every element of TS1 with every other element of TS2 and computing overall match score. For every element (T1$i$) of TS1, perform Steps 1404b and 1406b (1402b). Match T1$i$ with each element of TS2 and determine the best match score (1404b). Add best match score to MS (1406b). Return MS value (1408b).

FIG. 14C describes a procedure for matching two terms. Matching two terms involves matching T1(fF1, dF1, pF1, kF1) and T2(fF2, dF2, pF2, kF2) (1400c). Matching is based on five components: Term, fF, dF, pF, and kF (1402c). Compare T1 and T2 (1404c). If T1=T2, then C1=0; Else C1=Min (HDist(T1, T2), NDist(T1, T2)). Here, HDist is the distance in number of edges in a hierarchical tree between T1 node and T2 node, and NDist is the shortest distance in number of edges between T1 node and T2 node in a network of relationships among terms. Compute C2=|fF1−fF2| and C3=|dF1−dF2| (1406c). Also, compute C4=pLookupTable(pF1, pF2) and C5=kLookupTable(kF1, kF2) (1408c). The distance between {Product, Process, People} is defined in a table pLookupTable and similarly, the distance between {Technology, Research, and Market} is defined in a table kLookupTable. Finally, MatchScore is computed as W1*C1+W2*C2+W3*C3+W4*C4+W5*C5 (1410c).

FIG. 15 describes the procedure for the interactive tuning of the generated draft version of a presentation by a user. The input for interactive tuning process is the draft version of a presentation and this process results in the generation of the final version of the presentation (1500). The user analyzes the draft presentation slide by slide and performs Steps 1504 through 1510 for each slide (1502). Each slide is checked for relevance of theme, TAnnotation, and GAnnotation with respect to the input agenda (1504). If required, the user requests for slides with related themes, and the system searches Presentation database and provides slides that best match the given themes (1506). Similarly, if required, the user requests for slides with related annotations, and the system searches Presentation database and provides slides that best match the given annotations (both text and graphics annotations) (1508). If a more suitable slide is identified, it is used to replace the corresponding slide in the draft presentation (1510). The order of slides in the draft presentation is analyzed with respect to theme order and slides are reordered if necessary (1512). Finally, the draft presentation is verified for consistency and completion with respect to the agenda (1514). The resulting presentation is the final version of the presentation (1516).

FIG. 16 describes the procedure for template generation. The template is generated by analyzing the input best presentation (1600). Obtain the agenda corresponding to the best presentation (1602) and determine the combined roles and responsibilities (1604). Determine the presentation theme(s), interactively if necessary (1606). Update the template using the combined roles and responsibilities, and the theme(s) (1608). For each slide, perform Steps 1612 and 1614 (1610). Determine the slide theme(s), TAnnotation, and GAnnotation, interactively if necessary (1612) and update the template appropriately (1614). The information such as number of slides, slide order, mandatory and optional aspects of the slides related to the template are updated. If there are conditions related to roles, responsibilities, and themes, the same are identified and updated onto the template, and the individual slides are marked as either mandatory or optional (1616). These conditions provide adequate information to select the most appropriate template(s) during draft presentation generation. Finally, the generated template is added to Template database (1618).

FIG. 16A describes an additional procedure related to the generation of templates. The template generation is based on a set of annotated presentations (AP) and produces the most appropriate templates (1600a). Cluster AP based on presentation themes (1602a). For each cluster, Ci, perform the following steps (1604a). Check whether a template can be generated using Ci based on cluster size (1606a). For example, if a cluster is a singleton cluster, then such a cluster is not suitable for generating a template. If a template can be generated using Ci (1608a), find cluster representative based on presentation themes (1610a). Note that the cluster elements {P1, P2, . . . , Pn} are annotated presentations with presentation themes (TPi's). The determined cluster representative is the Template Theme (TTh). Measure the distance between TPi and TTh, and select Pj whose TPj is closes to TTh (1612a); set Pj as Anchor Template (AT). With respect to each slide, ATS, of AT, determine slides from other presentations in Ci and select those that are close to ATS based on TAnnotation and GAnnotation (1614a). Finally, the updated AT is a template (1616a).

FIG. 16B describes the procedure related to slide annotation. The procedure takes a slide (S) along with text portion (ST) and graphics portion (SG) and generates TAnnotation and GAnnotation for S (1600b). Let Tst={T1, T2, . . . , Tn} be a set of terms that are part of ST (1602b); only a subset of Tst would be part of TAnnotation. Cluster Tst based on Dij (1604b) where Dij is the distance between term Ti and term Tj with Dij=<Dij1, Dij2>; here, Dij1 is Min(HDist(Ti, Tj), NDist(Ti, Tj)) and Dij2 is the distance between Ti and Tj as per text portion of S (for example, this could be number of terms that separate Ti and Tj in left to right and top to down order). For each cluster, Ci, perform the following steps (1606b). Check whether Ci can be part of annotation based on cluster size (1608b). If so (1610b), select Ci cluster representative based on Dij between cluster elements (1612b). Let At be the Ci representative; each such representative is a part TAnnotation (1614b). Each term in At is further described using four factors: fF, dF, pF, and kF. Let Tim be a term in At. The factor, fF, is computed based on the number of occurrences of Tim in Tst (1616b). The factor, dF, is computed based on cluster size (1618b). dF is directly proportional to cluster size if Ci representative is a singleton; Else, dF is directly proportional to number of terms in Ci that are close to Tim (Ci'). In order to compute pF and kF factors, the terms in the dictionary are updated with appropriate pF and kF values. Each term in the dictionary is to have <D, S, L> factors with each in the range from 0-1 and sum to 1 (1620b). Compute DFim=Average (DFactor(Tiy)) over various Tiy in Ci or Ci' (1622b); DFactor(Term) obtains D factor value associated with Term; Similarly, compute SFim and LFim; Assign DFim, SFim, or LFim as dF of Tim based on whichever is highest. Similarly, compute TFim, RFim, and MFimn (1624b); Assign TFim, RFim, or MFim as kF of Tim based on whichever is highest. Repeat above steps to determine GAnnotation based on text content embedded in graphics portion of S (1626b).

FIG. 16C describes the procedure related to presentation theme. The procedure takes a presentation with multiple slides as input and generates the presentation theme (1600c); Note that each slide in the presentation has both TAnnotation and GAnnotation defined. Combine all annotations of all slides into TAGAs (1602c); Cluster TAGAs based on term-pair matching. Find the smallest number of clusters whose sizes together are close to the size of TAGAs (1604c). For each such selected cluster, find the cluster representative and make the same a part of Presentation Theme (1606c).

FIG. 16D describes the procedure related to cluster representative determination. The procedure takes a cluster T={T1, T2, . . . , Tn} of terms with N elements as input and determines the cluster representative (1600d). The cluster representative could be a single term or have multiple terms. Compute distance between two terms based on term-pair matching (1602d). Let Dij be a distance measure based on term-pair matching as depicted in the table below:

|    | T1  | T2  | ... | Tn  |
|----|-----|-----|-----|-----|
| T1 | —   | D12 |     | D1n |
| T2 | D12 | —   |     | D2n |
| .  |     |     |     |     |
| .  |     |     |     |     |
| Tn | D1n | D2n | ... | —   |

Find a subset ST of T such that for all Ti in T, Sum(min ({Diy|Ty is in ST}) is (near) minimal (1604d). An illustrative approach: Define SD(i)=Sum (Diy) with y from 1 to N; Let SD(m) be the minimum of SD(j) with j from 1 to N; Assign Tm to ST. Then, the cluster representative is ST (1606d).

FIG. 17 describes the overall network architecture of a network-based APG. In such a system, there are multiple APGs (1700) each with its own presentation database. The presentation database consists of (a) information related to slides (text and graphics annotations); (b) analogical examples; and (c) templates (1702). The objective is to cater to the needs of a multi-office enterprise in which each office has an APG and at times, it is required to exploit the information contained in the presentation databases of other offices. The main functionality of Presentation Coordinator (1704) is to ensure that the multiple APGs can interact with each other to obtain the required slides, analogical examples, and templates, and this is achieved by making use of a directory database (1706) that contains information related to the distributed presentation databases.

FIG. 18 describes the procedure for multi-APG interaction. Receive a request for information from presentation base of remote APGs from a source PO of an APG (1800). Analyze the type of request (1802) and if the request is for a template (1804), analyze the given roles, responsibilities, and themes with respect to PO directory (1806) and send the request to selected APGs (1808). Receive the results from the remote APGs (1810) and select the best possible template(s) (1812). One of the criteria for selection is the extent of match between input request and received results. Communicate the selected template(s) to the source PO (1814). On the other hand, if the request is for analogical examples (1820), send the request to all the remote APGs if PO directory does not contain enough information about example presentations (1822). Receive the results (1824), and analyze the results and order the example presentations based on the extent of match (1826). Select the best matching pre-defined number of example presentations (1828) and communicate the selected example presentations to the source PO (1830). If the request is for slides (1840), send the request (consisting of roles, responsibilities, and themes) to all the remote APGs (1842). Receive slides from multiple remote APGs (1844), and analyze the results and order them based on the extent of match (1846). Select the best matching pre-defined number of slides (1848) and communicate the selected slides to the source PO (1850).

Thus, a system and method for automatic generation of presentations based on annotated analogical examples, templates, and a collection of slides has been disclosed. Although the present invention has been described particularly with reference to the figures, it will be apparent to one of the ordinary skill in the art that the present invention may appear in any number of systems that perform automatic generation of presentations based on slides. It is further contemplated that many changes and modifications may be made by one of ordinary skill in the art without departing from the spirit and scope of the present invention.

The invention claimed is:

1. A system for automatic generation of a plurality of presentations and a plurality of templates based on a plurality of agendas, a plurality of audiences, and a plurality of annotated slides, said system including a computer having a computer readable medium having stored thereon instructions which, when executed by a processor of the computer, causes the processor to perform the steps of:
   determining an agenda from said plurality of agendas;
   determining an agenda description based on said agenda;
   determining a plurality of agenda terms based on term-frequency analysis of said agenda description;
   determining a plurality of agenda items based on said agenda;
   determining a plurality of participants based on said agenda, said plurality of audiences, and a plurality of roles of said plurality of audiences;
   computing a plurality of audience terms based on said plurality of participants;
   computing an agenda theme based on resolving said plurality of agenda terms and said plurality of audience terms;
   computing a plurality of agenda item terms based on term-frequency analysis of an agenda item of said plurality of agenda items;
   computing a plurality of resolved agenda items based on resolving of said plurality of agenda item terms and said plurality of audience terms; and
   matching a slide of said plurality of annotated slides based on said plurality of resolved agenda item terms and said agenda theme, wherein said step further comprises the steps of:
   determining a plurality of slide text terms based on a slide text annotation of said slide;
   determining a plurality of slide graphic terms based on a slide graphics annotation of said slide;
   determining a text match score based on a plurality of term match scores by term-set matching of said plurality of slide text terms and said plurality of resolved agenda item terms, wherein said step for determining a text match score further comprises steps of determining a term match score of said plurality of term match scores by term-pair matching of a slide text term of said plurality of slide text terms and a term of said plurality of resolved agenda item terms; and
   determining a graphics match score by term-set matching of said plurality of slide graphics terms and said plurality of resolved agenda item terms,
   wherein said slide is made a part of a presentation of said plurality of presentations based on said text match score and said graphics match score.

2. The system of claim 1, wherein said term-pair matching of a slide text term of said plurality of slide text terms and a term of said plurality of resolved agenda item terms further comprises:
   determining a first frequency factor (ff1) measure based on term-frequency analysis based on said slide text term;
   determining a second frequency factor (ff2) measure based on term-frequency analysis based on said term;
   determining a first detail factor (df1) measure based on said slide text term and a first pre-defined lookup table;
   determining a second detail factor (df2) measure based on said term and said first pre-defined lookup table;
   determining a first product/process/people factor (pf1) measure based on said slide text term and said first pre-defined lookup table;
   determining a second product/process/people factor (pf2) measure based on said term and said first pre-defined lookup table;
   determining a first knowledge factor (kf1) measure based on said slide text term and said first pre-defined lookup table;
   determining a second knowledge factor (kf2) measure based on said term and said first pre-defined lookup table;
   computing a term measure based on said slide term, said term, a plurality of term hierarchical relationships, and a plurality of term network relationships;
   computing a frequency factor (ff) measure based on an absolute difference between said ff1 and said ff2;
   computing a detail factor (df) measure based on an absolute difference between said df1 and said df2;
   computing a product/process/people factor (pf) measure based on said pf1, said pf2, and a second pre-defined lookup table;
   computing a knowledge factor (kf) measure based on said kf1, said kf2, and a third pre-defined lookup table; and
   computing said term match score based on said term measure, said ff measure, said df measure, said pf measure, said kf measure, and a plurality of pre-defined weights.

3. The system of claim 1, further comprising the steps of:
   determining a slide of a presentation of said plurality of presentations;
   determining a text portion of said slide;
   determining a graphics portion of said slide;

computing a plurality of text terms based on said text portion;

clustering said plurality of text terms resulting in a plurality of term clusters based on a distance measure, wherein said distance measure is based on a plurality of term hierarchical relationships and a plurality of term network relationships involving a pair of terms of said plurality of text terms;

selecting a term cluster of said plurality of term clusters based on a size of said term cluster;

computing a cluster representative of said term cluster based on said distance measure;

obtaining a term of said cluster representative;

computing a frequency factor (ff factor) associated with said term based on frequency of occurrence of said term in said text portion;

computing a detail factor (df factor) associated with said term based on size of said term cluster;

determining a plurality of product (D) factors associated with said cluster representative based on a plurality of dictionary terms;

determining a plurality of process (S) factors associated with said cluster representative based on said plurality of dictionary terms;

determining a plurality of people (L) factors associated with said cluster representative based on said plurality of dictionary terms;

computing a product/process/people factor (pf) associated with said term based on said plurality of D factors, said plurality of S factors, and said plurality of L factors;

determining a plurality of technology (T) factors associated with said cluster representative based on a plurality of dictionary terms;

determining a plurality of research (R) factors associated with said cluster representative based on said plurality of dictionary terms;

determining a plurality of market (M) factors associated with said cluster representative based on said plurality of dictionary terms;

computing a knowledge factor (kf factor) associated with said term based on said plurality of T factors, said plurality of R factors, and said plurality of M factors;

making said cluster representation a part of a text annotation (t-annotation);

making said t-annotation a part of said slide;

computing a plurality of text terms based on said graphics portion;

clustering said plurality of text terms resulting in a plurality of term clusters based on a distance measure, wherein said distance measure is based on said plurality of term hierarchical relationships, and said plurality of tens network relationships involving a pair of terms of said plurality of text terms;

selecting a term cluster of said plurality of term clusters based on a size of said term cluster;

computing a cluster representative of said term cluster based on said distance measure;

obtaining a term of said cluster representative;

computing an ff factor associated with said term based on a frequency of occurrence of said term in said text portion;

computing a df factor associated with said term based on size of said term cluster;

determining a plurality of D factors associated with said cluster representative based on a plurality of dictionary terms;

determining a plurality of S factors associated with said cluster representative based on said plurality of dictionary terms;

determining a plurality of L factors associated with said cluster representative based on said plurality of dictionary terms;

computing a pf factor associated with said term based on said plurality of D factors, said plurality of S factors, and said plurality of L factors;

determining a plurality of T factors associated with said cluster representative based on a plurality of dictionary terms;

determining a plurality of R factors associated with said cluster representative based on said plurality of dictionary terms;

determining a plurality of M factors associated with said cluster representative based on said plurality of dictionary terms;

computing a kf factor associated with said term based on said plurality of T factors, said plurality of R factors, and said plurality of M factors;

making said cluster representation a part of a graphic annotation (g-annotation);

making said g-annotation a part of said slide; and making said slide a part of a template of said plurality of templates.

4. The system of claim 3, further comprising the steps of:

determining a plurality of text annotations (t-annotations) associated with a plurality of slides associated with said template;

deteimining a plurality of graphic annotations (g-annotations) associated with said plurality of slides;

combining said plurality of t-annotations and said plurality of g-annotations to result in a plurality of presentation annotations;

clustering said plurality of presentation annotations based on a distance measure resulting in a plurality of annotation clusters, wherein said distance measure is based on a pair of terms of said plurality of presentation annotations, said plurality of term hierarchical relationships, and said plurality of term network relationships;

determining a plurality of minimal annotation clusters based on said plurality of annotation clusters, wherein the size of said plurality of minimal annotation clusters is close to the size of said plurality of presentation annotations; and determining a plurality of cluster representatives based on said plurality of minimal annotation clusters, wherein each of said plurality of cluster representatives is associated with a minimal annotation cluster of said plurality of minimal annotation clusters, wherein said plurality of cluster representatives is made a part of a presentation theme of said template.

* * * * *

UNITED STATES PATENT AND TRADEMARK OFFICE
CERTIFICATE OF CORRECTION

PATENT NO.        : 8,689,097 B2
APPLICATION NO.   : 11/650695
DATED             : April 1, 2014
INVENTOR(S)       : Sridhar Varadarajan et al.

It is certified that error appears in the above-identified patent and that said Letters Patent is hereby corrected as shown below:

In the Claims

Column 16, Line 52, Claim 2, delete "ffl" and insert -- ff1 --

Column 16, Line 54, Claim 2, delete "dfl" and insert -- df1 --

Column 16, Line 59, Claim 2, delete "kfl" and insert -- kf1 --

Column 17, Line 51, Claim 3, delete "tens" and insert -- term --

Column 18, Line 38, Claim 4, delete "deteimining" and insert -- determining --

Signed and Sealed this
Twenty-second Day of July, 2014

Michelle K. Lee
*Deputy Director of the United States Patent and Trademark Office*